United States Patent
Linstead

(10) Patent No.: US 8,990,527 B1
(45) Date of Patent: Mar. 24, 2015

(54) DATA MIGRATION WITH SOURCE DEVICE REUSE

(75) Inventor: Paul Linstead, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 702 days.

(21) Appl. No.: 11/824,430

(22) Filed: Jun. 29, 2007

(51) Int. Cl.
G06F 12/00 (2006.01)
G06F 13/00 (2006.01)
G06F 13/28 (2006.01)
G06F 3/06 (2006.01)

(52) U.S. Cl.
CPC ............ *G06F 3/0617* (2013.01); *G06F 3/0689* (2013.01); *G06F 3/0647* (2013.01)
USPC ........... 711/162; 711/161; 711/170; 711/171; 711/172; 711/173

(58) Field of Classification Search
USPC ................................ 711/161–162; 707/204
See application file for complete search history.

(56) References Cited

U.S. PATENT DOCUMENTS

| | | | | |
|---|---|---|---|---|
| 5,870,537 | A * | 2/1999 | Kern et al. | 714/6 |
| 6,351,779 | B1 * | 2/2002 | Berg et al. | 710/5 |
| 6,598,134 | B2 * | 7/2003 | Ofek et al. | 711/162 |
| 6,874,046 | B1 * | 3/2005 | LeCrone et al. | 710/74 |
| 7,120,673 | B2 * | 10/2006 | Kitamura et al. | 709/213 |
| 7,146,475 | B2 * | 12/2006 | Perego | 711/162 |
| 7,386,552 | B2 * | 6/2008 | Kitamura et al. | 1/1 |
| 2003/0140210 | A1 * | 7/2003 | Testardi | 711/203 |
| 2005/0283564 | A1 | 12/2005 | LeCrone et al. | |
| 2006/0242431 | A1 | 10/2006 | LeCrone et al. | |
| 2008/0005504 | A1 * | 1/2008 | Barnes et al. | 711/156 |
| 2008/0086608 | A1 * | 4/2008 | Kano | 711/162 |
| 2010/0077169 | A1 * | 3/2010 | Pace | 711/165 |

OTHER PUBLICATIONS

U.S. Appl. No. 10/956,484, LeCrone, et al.
U.S. Appl. No. 10/879,383, Halligan, et al.
U.S. Appl. No. 11/824,239, Linstead.
R. Cwiakala, et al., "MVS Dynamic Reconfiguration Management," *IBM J. Res. Develop.* vol. 36, No. 4, Jul. 1992, pp. 633-646.

* cited by examiner

*Primary Examiner* — Yaima Rigol
(74) *Attorney, Agent, or Firm* — Muirhead and Saturnelli, LLC

(57) ABSTRACT

Releasing a data set at a source device in connection with migrating data from the source device to a target device includes mapping application address space to address space containing metadata for the target device and providing additional local metadata therefor, replacing within the application the address of metadata for the source device with the address of metadata for the target device, setting a diversion flag that is part of the additional local metadata, where the diversion flag indicates a remapping of extent, and closing and unallocating the data set at the source device. Releasing a data set at a source device in connection with migrating data from the source device to a target device may also include determining if an application uses standard I/O operations. The metadata may include UCB data.

20 Claims, 24 Drawing Sheets

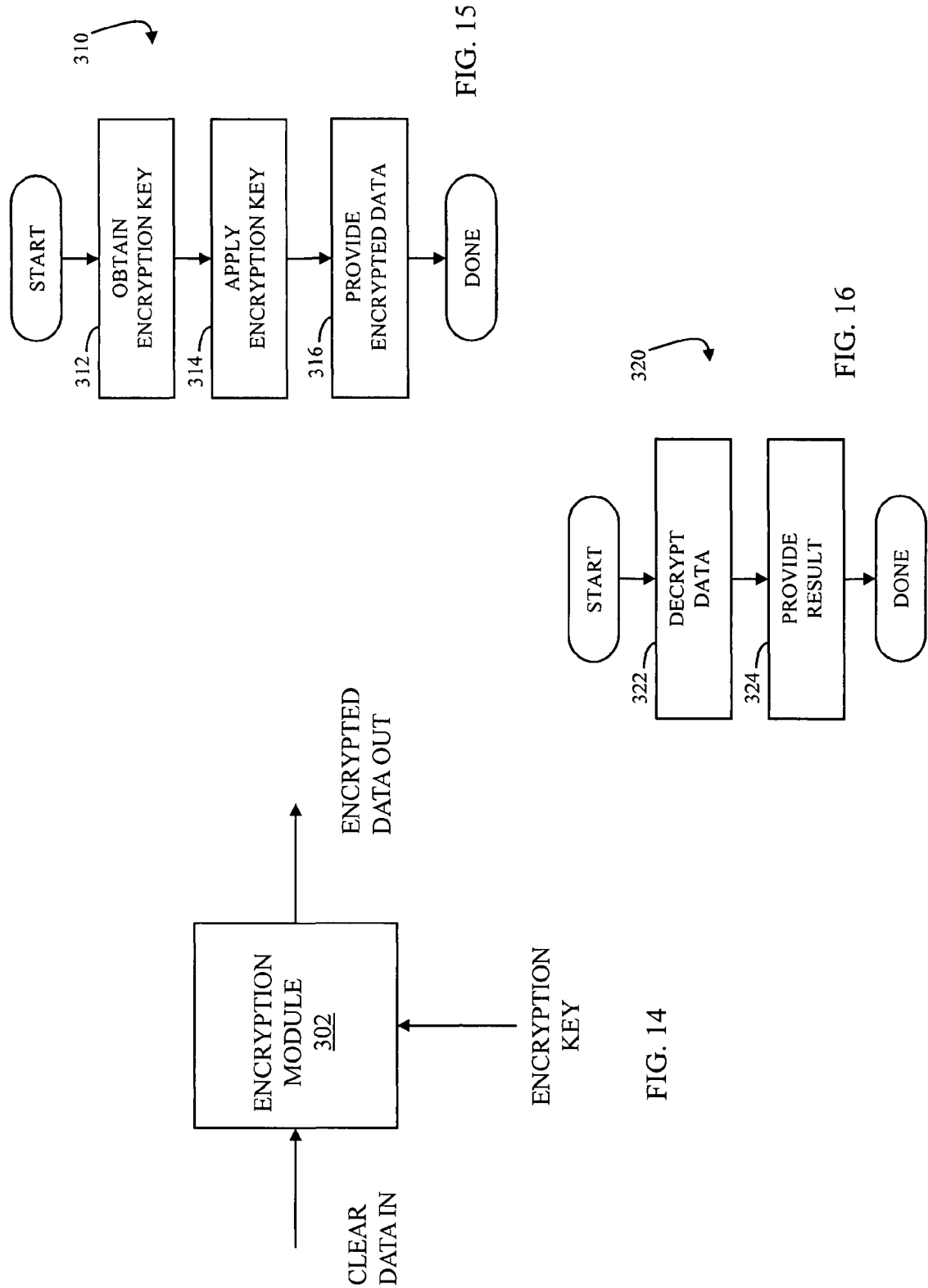

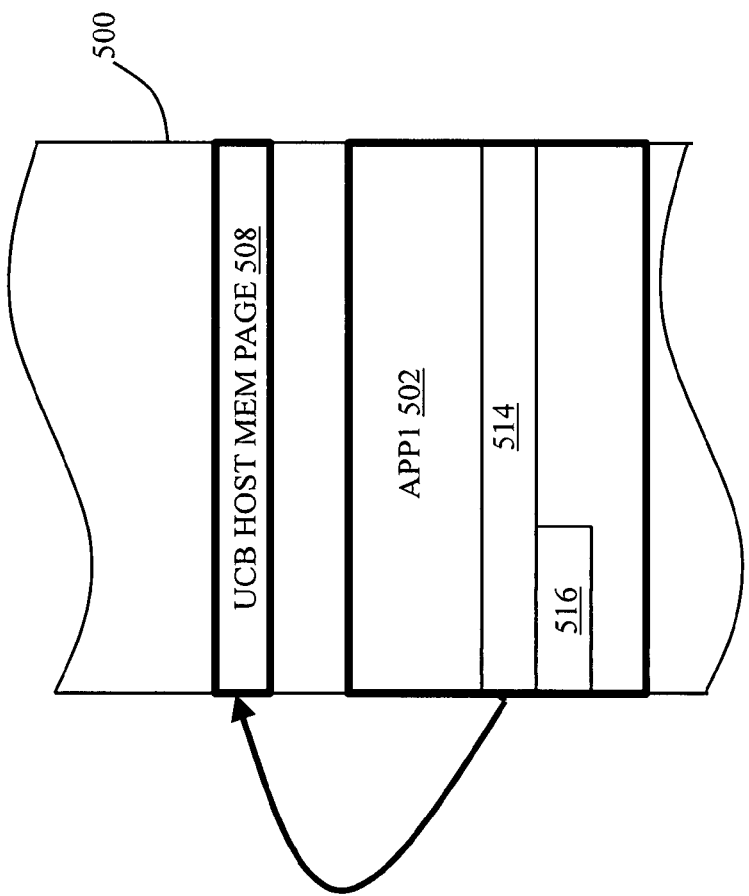
FIG. 20
FIG. 21
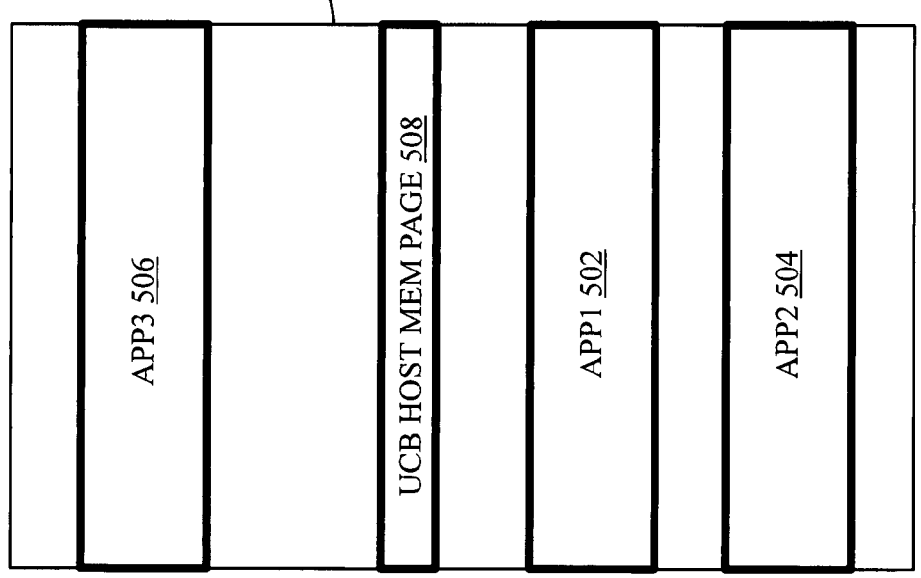
FIG. 19

DATA MIGRATION WITH SOURCE DEVICE REUSE

BACKGROUND OF THE INVENTION

1. Field of the Invention

This invention relates to data storage facilities and more specifically to migrating data between data storage facilities.

2. Description of Related Art

A data storage facility generally comprises a disk array storage device that includes physical storage media and related controls. For example, a typical disk array storage device includes a plurality of physical disk drives as physical storage media. The controls include a cache memory, an interconnecting bus and adapters. At least one host adapter connects between a host processor, or "host" and the bus. A plurality of disk adapters act as interfaces between the bus and the physical disk drives.

From the perspective of applications being processed by a host, disk storage typically is organized into "logical devices". Such "logical devices" are also known as "logical storage devices", "logical volumes" and "devices". The following discussion uses "logical device." Each logical device may reside in part of, or in the entirety of, a single physical disk drive. A logical device also may reside on multiple physical disk drives. Logical devices may store one or more "data sets", also called files. Each data set comprises one or more extents. An extent is defined by one or more contiguous storage locations, typically contiguous cylinders or tracks in a disk storage system. A plurality of data sets may be designated as a "group."

An operating system provides control routines and data structures to interface a host application with a data storage facility. I/O requests from a host application generally define an operation, like a "read" or "write" operation, and logical device addresses for logical storage locations from which or to which the data is to be retrieved (read) or sent (written) respectively.

IBM-based systems, for example, use an MVS® operating system that includes access methods, a unit control block (UCB) and related structures that are assigned to each logical device. Operating system I/O control routines use these unit control blocks to convert the logical device addresses provided by the application into connection-based addressing recognized by the storage facility. Metadata, such as that in the volume table of contents (VTOC), provides the exact cylinder and head ranges occupied by multiple extents on that logical device assigned to a particular data set. Although a single extent occupies contiguous storage locations in a single logical device, such operating systems may scatter the individual extents in a data set across a number of logical devices.

As the quantity of stored data grows, the quantity of data in existing data storage facilities approaches a maximum capacity. Additions to that capacity often involve the addition of newer data storage facilities have greater capacities and improved performance. Consequently, it has become desirable to replace existing data storage facilities with the addition of newer data storage facilities which may be faster and have a larger capacity.

Replacing data storage facilities requires a transfer of data from the older data storage facilities to the newer data storage facility or facilities. In some cases, data migration may be performed while applications are accessing the data. See, for example, published PCT patent application PCT/US2006/024535, which is incorporated herein by reference. However, one difficulty with the system disclosed in PCT/US2006/024535 and in similar systems is that even after the data has been migrated, proper diversion to the target device requires maintaining the UCB for the source device, and thus maintaining the source device itself, until all applications that initially access the source device have terminated. The source device may not be reused until all applications have terminated (see, for example, FIG. 9 of PCT/US2006/024535).

Accordingly, it is desirable to provide a system that allows reuse of a source device prior to termination of all application that access the source device.

SUMMARY

According to the present invention, releasing a data set at a source device in connection with migrating data from the source device to a target device includes mapping application address space to address space containing metadata for the target device and providing additional local metadata therefor, replacing within the application the address of metadata for the source device with the address of metadata for the target device, setting a diversion flag that is part of the additional local metadata, where the diversion flag indicates a remapping of extent, and closing and unallocating the data set at the source device. Releasing a data set at a source device in connection with migrating data from the source device to a target device may also include determining if an application uses standard I/O operations. The metadata may include UCB data. In response to the diversion flag being set, extents for the source device may be remapped to extents for the target device prior to an I/O operation. Releasing a data set at a source device in connection with migrating data from the source device to a target device may also include replacing instances of extents for the source device with extents for the target device. Releasing a data set at a source device in connection with migrating data from the source device to a target device may also include, after a predetermined amount time without use of the extents for the source device, clearing the diversion flag. A UCB for the source device may be maintained until all diversion flags for data sets thereon are closed. Replacing instances of extents for the source device with extents for the target device may be performed in response to an extents inquiry. The additional local metadata may include an address of a UCB for the source device, an address of a UCB for the target device, and an offset within the mapped application address space of the UCB of the target device. The additional local metadata may be provided immediately following the application address space mapped to the address space containing metadata.

According further to the present invention, computer software, provided in a computer-readable medium, releases a data set at a source device in connection with migrating data from the source device to a target device. The software includes executable code that maps application address space to address space containing metadata for the target device and provides additional local metadata therefor, executable code that replaces within the application the address of metadata for the source device with the address of metadata for the target device, executable code that sets a diversion flag that is part of the additional local metadata, where the diversion flag indicates a remapping of extents, and executable code that closes and unallocates the data set at the source device. The software may also include executable code that determines if an application uses standard I/O operations. The metadata may include UCB data. In response to the diversion flag being set, extents for the source device may be remapped to extents for the target device prior to an I/O operation. The software may also include executable code that replaces instances of extents for the source device with extents for the target device. The software may also include executable code that clears the diversion flag after a predetermined amount time without use of the extents for the source device. A UCB for the source device may be maintained until all diversion flags for data sets thereon are closed. Executable code may replace instances of extents for the source device with extents for the target device in response to an extents inquiry. The additional local metadata may include an address of a UCB for the source device, an address of a UCB for the target device, and an offset within the mapped application address space of the UCB of the target device. The additional local metadata may be provided immediately following the application address space mapped to the address space containing metadata.

According further to the present invention, providing a mechanism for performing special processing in connection with application I/O operations for a device includes mapping application address space to address space containing metadata for the device and providing additional local metadata therefor and providing an eyecatcher in the additional local metadata. Providing a mechanism for performing special processing in connection with application I/O operations for a device may also include determining if the application uses standard I/O operations. The metadata may include UCB data. The additional local metadata may be provided immediately following the application address space mapped to the address space containing metadata. Providing a mechanism for performing special processing in connection with application I/O operations for a device may also include determining whether a UCB is mapped in application address space. Providing a mechanism for performing special processing in connection with application I/O operations for a device may also include, in response to a UCB being mapped to application address space, determining whether an eyecatcher is present. In response to the eyecatcher being present, special processing may be performed. The special processing may include diverting I/O operations from a source device to a target device.

According further to the present invention, computer software, provided in a computer-readable medium, provides a mechanism for performing special processing in connection with application I/O operations for a device. The software includes executable code that maps application address space to address space containing metadata for the device and providing additional local metadata therefor and executable code that provides an eyecatcher in the additional local metadata. The software may include executable code that determines if the application uses standard I/O operations. The metadata may include UCB data. The additional local metadata provided immediately following the application address space may be mapped to the address space containing metadata. The software may also include executable code that determines whether a UCB is mapped in application address space. The software may also include executable code that determines whether an eyecatcher is present in response to a UCB being mapped to application address space. In response to the eyecatcher being present, special processing may be performed. The special processing may include diverting I/O operations from a source device to a target device.

BRIEF DESCRIPTION OF THE DRAWINGS

The appended claims particularly point out and distinctly claim the subject matter of this invention. The system described herein will be more fully apparent from a reading of the following detailed description in conjunction with the accompanying drawings in which like reference numerals refer to like parts, and in which:

FIG. 14 illustrates an embodiment of an encryption module according to the system described herein;

FIG. 15 is a flow chart that illustrates steps performed in connection with data migration when data migration is coupled with encryption as described herein.

FIG. 16 is a flow chart that illustrates steps that may be performed in connection with decrypting data according to the system described herein.

FIG. 19 is a diagram illustrating a memory of a host according to an embodiment of the system described herein.

FIG. 20 is a diagram illustrating a UCB host memory page according to an embodiment of the system described herein.

FIG. 21 is a diagram illustrating a portion of a memory of a host according to an embodiment of the system described herein.

DESCRIPTION OF ILLUSTRATIVE EMBODIMENTS

Figure 1:
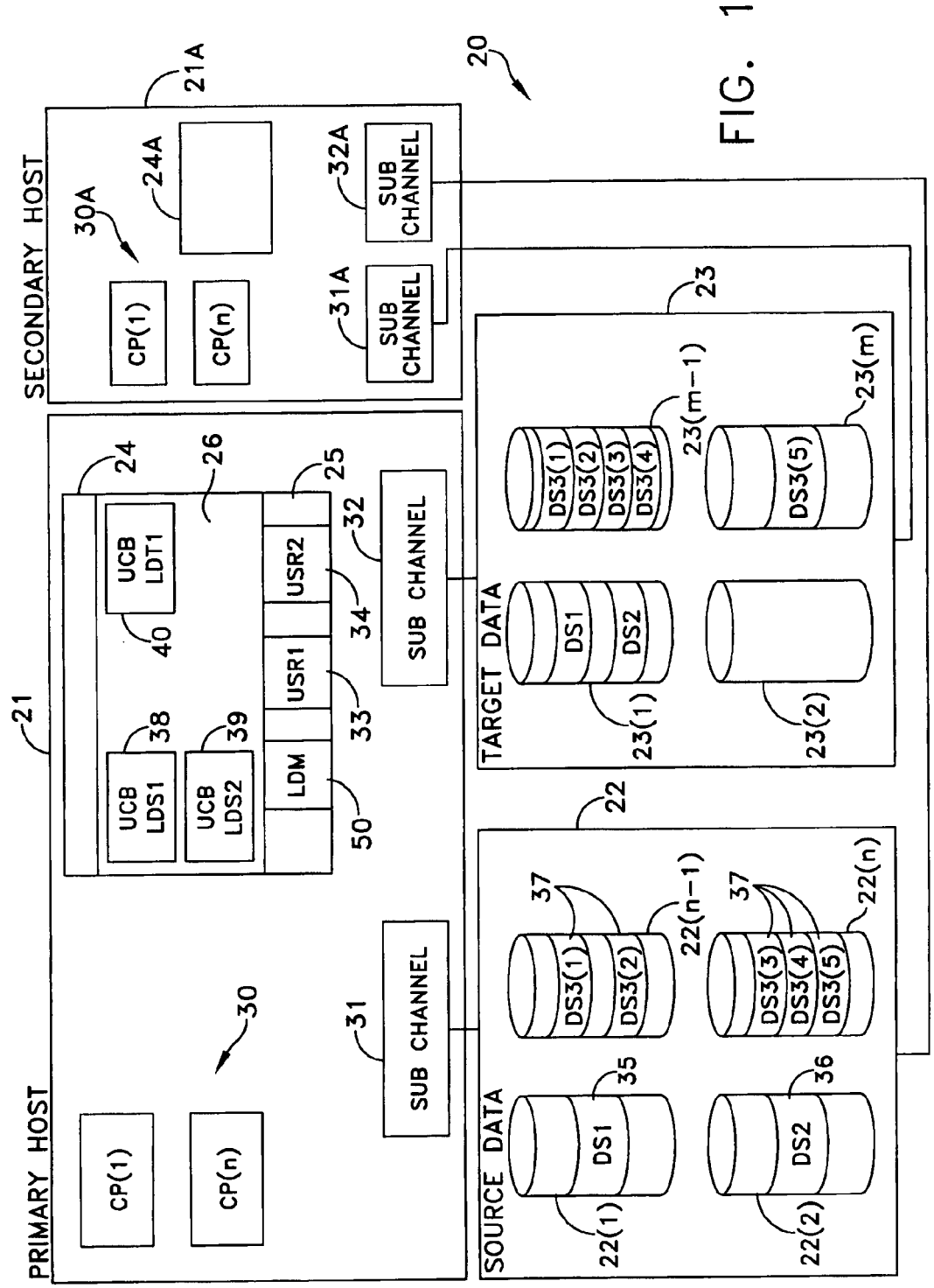
FIG. 1 is a block diagram of a multiple host data processing system that can benefit from this invention and that includes multiple data storage facilities.

FIG. 1 depicts, as an example, a data processing system 20 that includes a host 21 and two disk array storage devices as data storage facilities 22 and 23. As known in the art, the host 21 includes a main memory 24 divided into at least one private area 25 and a common storage area 26. One or more processors 30 interact with the memory 24.

Communications between the single host 21 and input-output devices, such as the data storage facilities 22 and 23, occur through sub-channels. For purposes of explaining this invention, a sub-channel 31 interfaces the host 21 and the source data storage facility 22; a sub-channel 32, the target data storage facility 23. The secondary host 21A has a similar construction with multiple processors 30A, a memory 24A and sub-channels 31A and 32A.

As previously described, a host application and a data storage facility identify the location of data differently. That is, host applications view data at a logical level as data extents or "extents" and/or data sets of one or more extents. The operating system, such as the MVS operating system (z/OS), converts the host addressing format for the data into an addressing format for the data storage facility.

More specifically, the operating system uses an access method as an interface between the host application and low level routines, like the EXCP, media manager and I/O device routines. The I/O driver routines call low level functions, such as a STARTIO function to initiate I/O through a subchannel thereby to pass information to and from the data storage facility. The operating system uses information from an integrated catalog facility (ICF) that contains, among other things, the Catalog, VTOC, VVDS and other components well known in the art, to translate a data address from the addressing format received from an application into the addressing format that identifies the data by a logical device, cylinder and head. This information is generally called "metadata". The data storage facility includes information for changing this logical device addressing format to the physical disk drive addressing format.

For purposes of understanding this invention, assume that the data storage facility 22 in FIG. 1 is an existing, or source, data storage facility and that the data storage facility 23 is either a new or a preexisting data storage facility that is to act as a target to receive data from the source data storage facility 22. The data storage facility 22 has "n" logical devices with logical devices 22(1), 22(2), 22(n−1) and 22(n) being shown in FIG. 1. The data storage facility 23 has "m" logical devices with logical devices 23(1), 23(2), 23(m−1) and 23(m) being shown. In the following discussion the logical devices in the data storage facility 22 are called "source logical devices"; the logical devices in the data storage facility 23, "target logical devices."

The host 21 in FIG. 1 represents a typical mainframe system with multiple processing units controlled by an operating system, such as an IBM mainframe system operating with the IBM MVS operating system. In such a host, user applications provide the control for manipulating useful data. A USR1 application 33 and a USR2 application 34 represent two such user applications. For example, the USR1 application 33 might handle transaction processing; the USR2 application 34 might generate reports based upon the data supplied through the USR1 application 33. Often applications such as the USR1 application 33 must be available 24 hours per day, 7 days a week. Report applications may run periodically.

As known, extents forming a data set may be stored in any number of ways. That is, extents in one data set may be contiguous or non-contiguous. For example, assume that the USR1 application 33 and USR2 application 34 interact with three separate data sets designated as a DS1 data set 35, a DS2 data set 36 and a DS3 data set 37 in the source data storage facility 22. For purposes of explanation, assume that all the extents in the DS1 and DS2 data sets 35 and 36 are contiguous and that each data set resides in one logical device. Assume that the DS3 data set 37 has five extents with two extents, DS3(1) and DS3(2) residing non-contiguously on source logical device 22(n−1), while extents DS(3), DS(4) and DS(5) reside contiguously on source logical device 22(n).

This invention has the capability of migrating data sets with contiguous extents, non-contiguous extents or a combination thereof. With reference to the specific embodiment of FIG. 1, this invention has the capability of migrating each of the disclosed data sets from the source logical devices 22(1), 22(2), 22(n−1) and 22(n) to target logical devices in the data storage facility 23 without interrupting any interaction between the user applications 33 and 34 and the data in the DS1, DS2 and DS3 data sets 35, 36 and 37. For example, both the DS1 and DS2 data sets 35 and 36 can migrate to one logical device, such as the target logical device 23(1). FIG. 1 also depicts an operation by which four extents of the DS3 data set 37 migrate to contiguous locations in the target logical device 23(m−1) while the fifth extent DS3(5) migrates to the target logical device 23(m).

The memory 24 in FIG. 1 contains a Unit Control Block (UCB) for each of the logical devices in both the data storage facilities 22 and 23. These unit control blocks are stored in the common area 26 of the memory 24. FIG. 1, by way of example, depicts a UCB LDS1 control block 38 associated with the source logical device 22(1) that contains the DS1 data set 35. A UCB LDS2 unit control block 39 is associated with the source logical device 22(2). A UCB LDT1 unit control block 40 is associated with the target logical device 23(1). Other unit control blocks, not shown, are associated with each of the other logical devices shown in FIG. 1.

Figure 2:
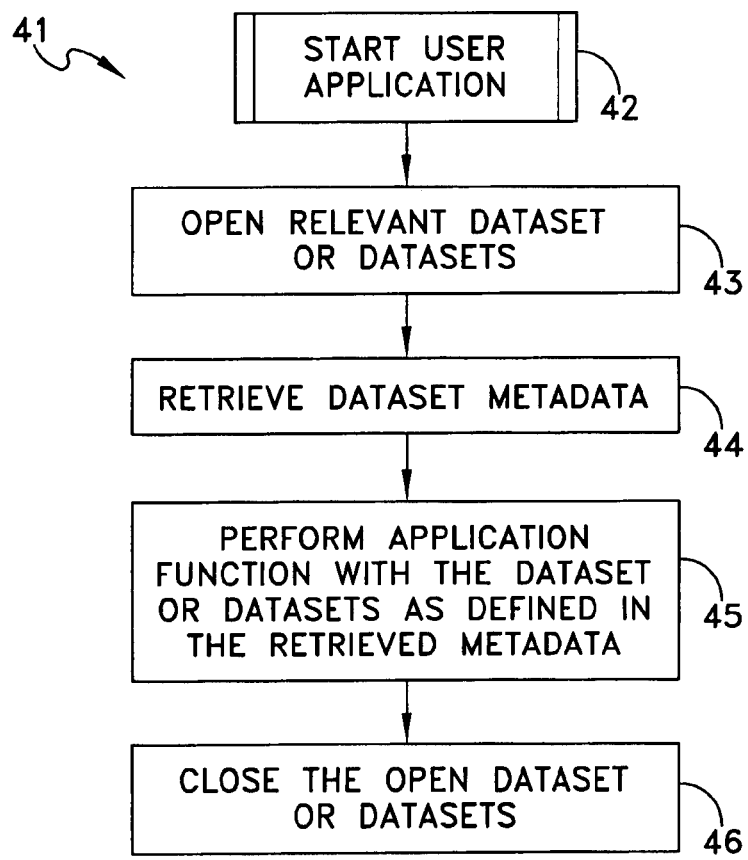
FIG. 2 is a flow chart that depicts a typical prior art interaction between an application and a data set.

Before describing an illustrative embodiment of this invention, it will be helpful to review the basic operating steps of a user application as shown by the sequence 41 in FIG. 2. When a user application, such as the USR2 application 34, is initialized, step 42 performs certain preliminary functions that are not relevant to this invention. Then step 43 opens one or more relevant data sets. For example, the USR1 application 33 could open the DS1 and DS3 data sets 35 and 37 while the USR2 application 34 could open the DS2 data set 36. In part of that process the USR1 and USR2 applications 33 and 34 retrieve the corresponding data set metadata in step 44. Of importance to this invention, the metadata will include MVS catalog information that provides a volume serial number which the system maps to a particular logical device and UCB at any point in time. The VTOC provides the extent list with a set of cylinder and head ranges.

Step 45 performs the application function using the metadata it has retrieved for controlling I/O requests with various input-output units including for example, the data storage facility 22 in FIG. 1, and particularly the DS1 data set 35, the DS2 data set 36, and the DS3 data set 37. Moreover, each application that opens a data set to be migrated continues to use the original metadata for that data set until the application closes that data set. That is, when an application terminates, step 46 closes any open data set or data sets that the application opened in step 43. However, when one application closes a data set, it is possible for that data set to still be opened to another application. An understanding of this process is important because when an application closes a data set after a migration occurs, the application accesses the migrated data on a target logical device directly when the application subsequently opens the data set.

Logical Data Migration—Command

In many situations a set of configuration statements control the operation of control applications, like the logical data migration application of this invention. In some control applications, a set of one or more configuration statements may initiate different phases of the control application. In an implementation of this invention, different configuration statement sets will enable the commencement of initialization, migration and diversion, and termination phases. It is within the skill of those in the art to generate the necessary configuration statements with knowledge of the function of the control application and the specific configuration of the data processing system.

For purposes of this explanation, a "command" represents a set of configuration statements and describes the information related to this invention to enable a person to prepare the necessary configuration statements. A given command will be considered to have the capability of controlling the commencement of a single phase or multiple phases in sequence. Also each phase will be considered to be implemented as a module for performing that specific phase.

Figure 3:
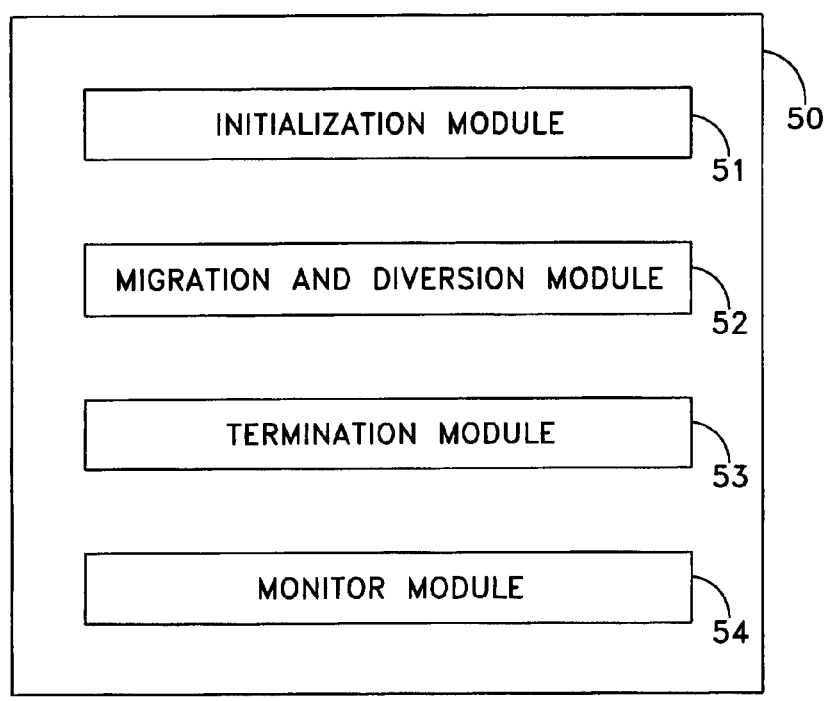
FIG. 3 is a block diagram of the organization of a logical migration application that operates in accordance with this invention.

With this background, FIGS. 1 and 3 depict one example of a Logical Device Migration (LDM) application 50 that can be characterized as migrating one or more data sets from a plurality of extents in one or more source logical devices to one or more target logical devices. As an aid to understanding this invention, this specific LDM logical application is expressed as having four separate operating modules, each representing a specific function or related group of functions. These include an initialization module 51, a migration and diversion module 52, a termination module 53 and a monitor module 54.

When the LDM application 50 is loaded into the memory 24, as in the private application memory 25, it enables the processor 21 to respond to an LDM command that has information in the form of arguments or fields. Basically the command will include the following information:

1. A command identifier, such as "LDM" or an equivalent operation code, which identifies the command as a logical data migration command.
2. Arguments identifying the modules of FIG. 3 to be executed in response to the command. For example, these could include an initialization argument, a migration-and-diversion argument, a termination argument, a monitor argument, or some combination of some or all of those arguments;
3. An identification of the source data sets that will be identified by name, either specifically or via pattern matching, and/or by identifying the various source volumes. Identification of the target logical devices will be made either specifically or via rules such as those used by IBM's Storage Management System, i.e., the so-called Storage Group, or similar facility. There are a variety of ways known in the art to identify data groups, sets and extents in a data storage facility;
4. A threshold argument that establishes the number of cylinders or tracks below which the remaining tracks are copied with application I/O quiesced to establish full synchronization and a mirrored state;
5. When data sets are organized in data groups, an argument can determine whether the group migration is to occur in a consistent manner; and
6. In a multi-host network, such as shown in FIG. 1 formed with another host 21A, whether the host is a primary, or owner, host or a secondary, or non-owner, host.

Figure 4:
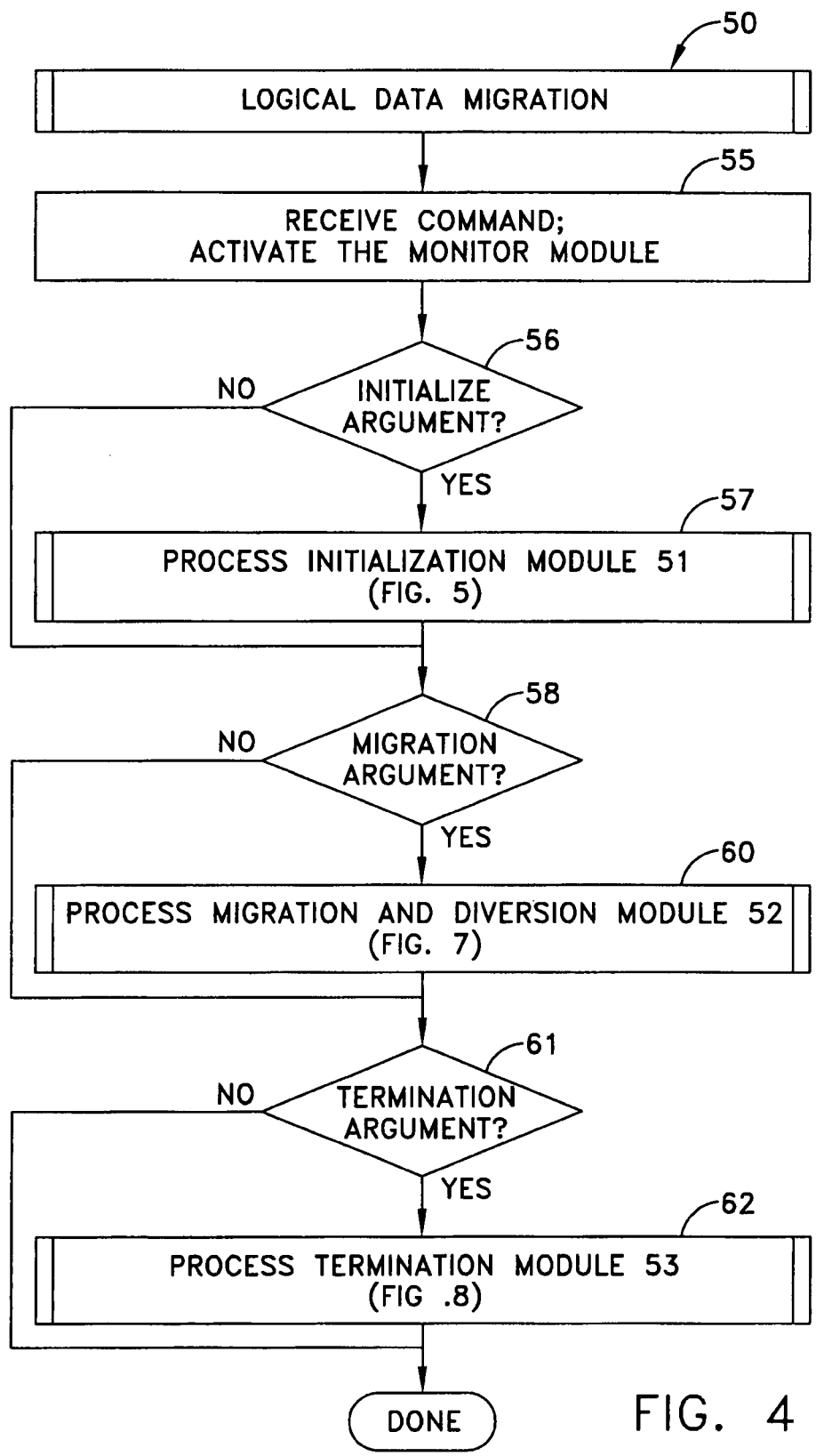
FIG. 4 is a flow diagram that depicts the operation of the logical migration application in response to a command.
Figure 11:
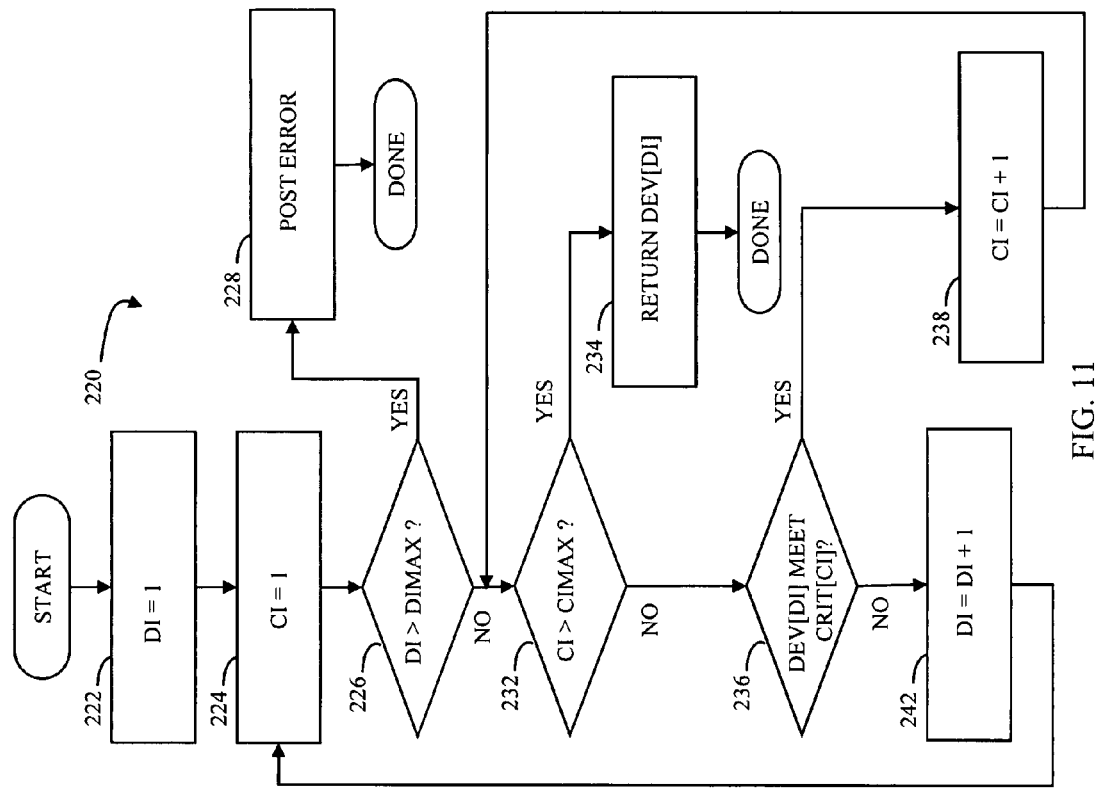
FIG. 11 is a flow diagram illustrating selection of a target logical device for data set migration.

Once the logical data migration application is loaded and activated, the execution of an LDM or equivalent command will initiate any of a variety of operations or sequences as depicted in FIG. 4. For example, step 55 represents the receipt of the command and activation of the monitor module 54 for transactions between that host and any extent to be migrated in response to the LDM command. Step 56 and 57 process the initialization module 51 according to FIG. 5 in response to a valid argument. If the migration-and-diversion argument is valid, step 58 enables step 60 to process the migration and diversion module 52 in accordance with the steps shown in FIGS. 7 through 10 that migrate the data. If the termination argument is valid, step 61 enables step 62 to process the termination module as shown in FIG. 11. This particular implementation would enable all the procedures shown in FIG. 3 to be processed in sequence in response to one command. However, as will become apparent, a first command typically may include only a valid initialization argument or both a valid initialization argument and a migration and diversion argument. Some time later an LDM command would be issued with only a valid termination argument.

Logical Data Migration—Initialization Phase

When an LDM command with the initialization argument is received, the LDM application 50 utilizes the initialization module 51 to generate control data structures that identify the location of the extents in the source logical device and locations in the target storage logical device for each extent to be migrated. The initialization module also stores configuration information related to the source and target logical devices.

Figure 5:
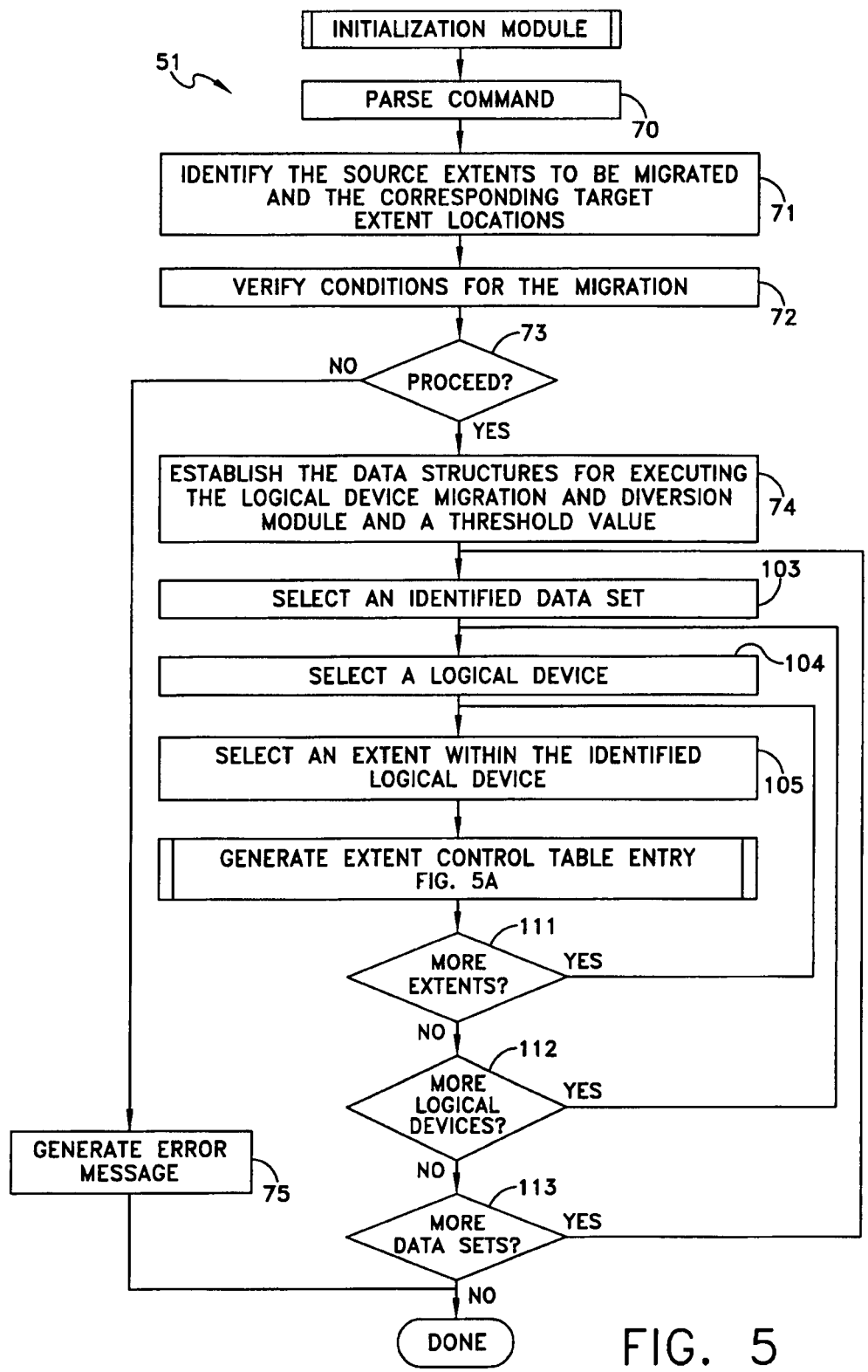
FIG. 5 is a flow diagram of the operation of an initialization module shown in FIG. 3.

More specifically, upon receipt of a command with the initialization argument set, step 57 in FIG. 4 transfers control to step 70 in FIG. 5 that parses the LDM command in step 71. Parsing provides information from the LDM command that identifies the need for consistent data migration and the threshold value. Parsing the LDM command also provides information from which the source extent and the corresponding target extent locations can be determined.

Step 72 verifies the conditions for the migration are satisfied. For example, verification could include determining whether the source and target logical device are compatible. When the conditions are verified, step 73 transfers control to step 74 to continue the initialization module. Otherwise step 73 transfers control to step 75 to generate an error message and terminate any further response to the command, effectively aborting the logical data migration.

Figure 6:
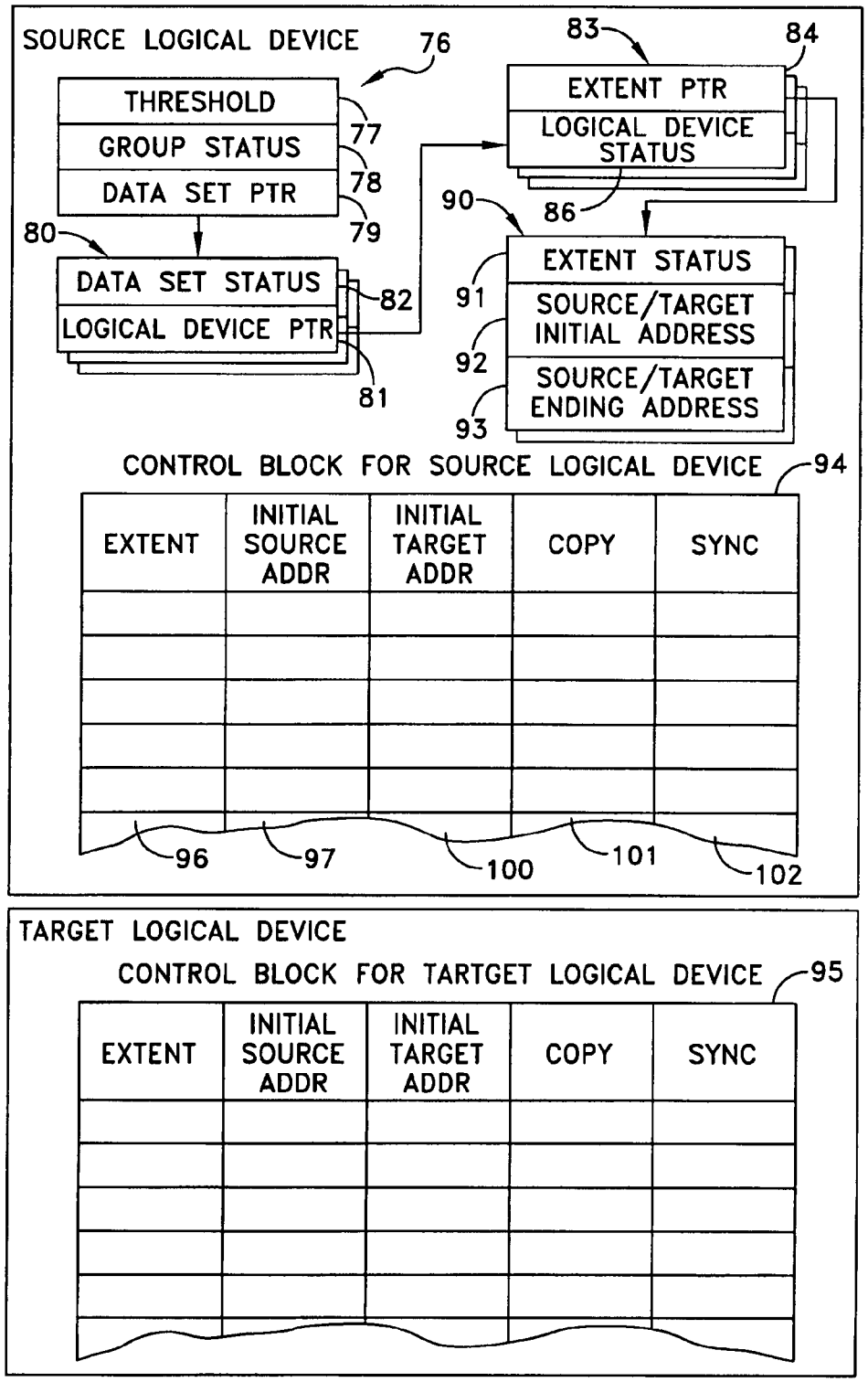
FIG. 6 is a block diagram depicting one example of a data structure generated by the initialization module shown in FIG. 5.

Step 74 establishes data structures corresponding to those shown in FIG. 6 for use during the execution the logical device migration and diversion module 52. It also loads the threshold value upon the corresponding argument or the LDM command. Specifically, FIG. 6 depicts data structures with a group block 76 that receives in different locations a threshold value entry 77, a group status entry 78 and a data set pointer 79. The data set pointer 79 identifies a location for a first data set block 80. Each data set block, such as data set block 82, has locations for a logical device pointer 81 and a data set status entry 82. Each data set block will also include any of various known means to link the individual data set blocks for all the data sets in the group.

The logical device pointer 81 points to a first logical device block 83 that includes locations for an extent pointer 84 and a logical device status entry 85. The extent pointer 84 typically identifies the location of a first extent block, like the extent block 90, for the selected logical device. Links to all other logical devices associated with the data set will also exist.

An extent block 90 includes specific information about a specific extent. One location contains an extent status entry 91. Other locations store representations of addresses, such as initial source and target addresses 92 and ending addresses 93. Each of the addresses 92 and 93 can be constituted by an absolute address or a base addresses or offsets or by some address convention. In the same manner as previously described, links are provided for all the extent blocks associated with a single logical device.

Still referring to FIG. 6, the data structures include track-cylinder control blocks, hereinafter "control blocks", 94 and 95. Control block 94 and blocks 76, 80, 83 and 90 are stored in association with the source logical device. In FIG. 1, the information would be stored in the data storage facility 22. These data structures may be stored in cache memory, a physical disk or both, depending upon the configuration of the data storage facilities. Typically, however, the source logical device control blocks and data pointers will also be stored in the main memory 24 of FIG. 1. Control block 95 typically will be stored on the target logical device.

In an embodiment where control is desired on a track-by-track basis, each entry in the control blocks 94 and 95 includes an extent status entry 96, a single source track address in column 97 and a corresponding target track address in column 100. If an extent occupies one or more complete cylinders, the source and target address entries in columns 97 and 100 can define the address only to the cylinder level. In that event each row in the control blocks 94 and 95 will identify an initial cylinder address. If the extent does not begin and end at a cylinder boundary, the entries will be to a cylinder and head address to provide individual track addressing.

A COPY column 101 records, for each track, whether the track still requires copying. In some situations the copy column 101 may be constituted by a track table associated with the source logical device. In such a case, the control blocks 94 and 95 may also include a SYNC column 102 to reflect the tracks that need to be copied.

Referring to FIGS. 5 and 6 together, after step 74 establishes the data structures in FIG. 6, the remaining steps of FIG. 5 populate the various data structures. As part of this process, step 103 selects one of the identified data sets, such as the data set identified by the data set pointer 79. Steps 104 and 105 use information from the ICF to identify the location of each logical device that stores extents for that data set and one of the extents. In response, a process shown in FIG. 5A generates the extent block control table entries, with step 106 generating the starting and ending addresses for the extent in the source logical device. Step 107 provides the starting address for the extent in the target logical device. When this information has been loaded into blocks 92 and 93 in FIG. 6, respectively, step 108 sets a corresponding extent status entry, like the extent status entry 91, to an initial COPY value to indicate a COPY state.

Step 110 then populates each of the track cylinder control blocks 94 and 95 with data. That is, for each track or cylinder within the identified extent, step 110 makes an entry in a given row. Consequently a given extent may have a number of different entries in the track cylinder control blocks 94 and 95. In addition, step 110 will establish initial values for all the COPY bits in column 101 and all the SYNC bits in column 102 to indicate that each corresponding track must be copied. Step 110 also will set initial status values for each in corresponding status entry.

Figure 5A:
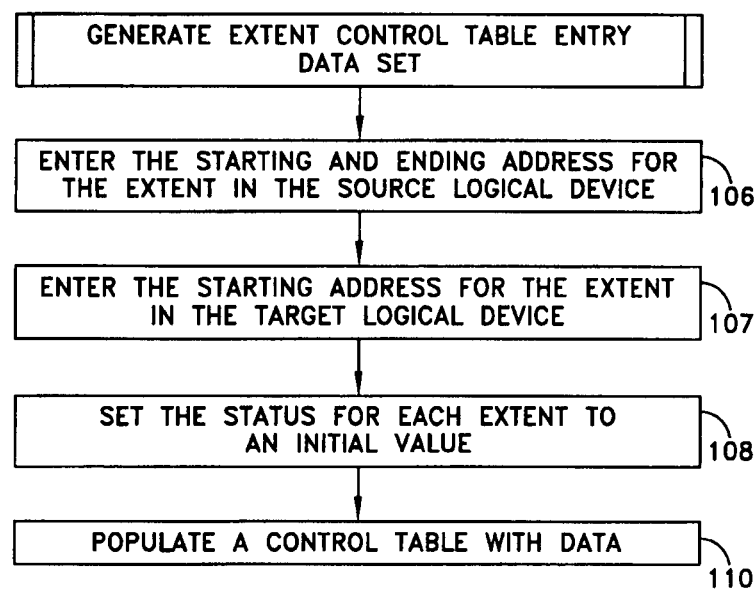
FIG. 5A is a more detailed flow diagram of an operation shown in FIG. 5.

Referring back to FIG. 5, the module uses step 111 as a loop control to assure that the procedure of FIG. 5A populates extent blocks 90 and track cylinder control blocks 94 and 95 for each track in the identified extent. If an additional extent must be processed within the data set, control passes from step 111 back to step 105.

When all the control data for the extents of a data set in the selected logical device have populated the control data structures, step 111 transfers control to step 112 that assures all the logical devices in the data set are processed. If they are not, control passes back to step 104 to select another logical device containing extents for the data set selected in step 103. When all the extents in all the logical devices for a data set have been processed, step 112 transfers control to step 113. Step 113 is a loop control to assure that all the data sets identified in the LDM command have been processed. If additional data sets exist, control passes from step 113 back to step 103. When all the data sets have been processed, operations of the initialization module 51 cease and the data structure in FIG. 6 is fully populated.

Thus, when the initialization module 51 completes its operation, an environment exists for controlling the data migration. The monitor function is active and the data structures are active. Now, by virtue of an LDM command sent with both valid initialization and migration-and-diversion arguments or a subsequent LDM command with a valid migration-and-diversion argument, the migration and diversion begins.

Logical Data Migration—Migration and Diversion Phase

Figure 7:
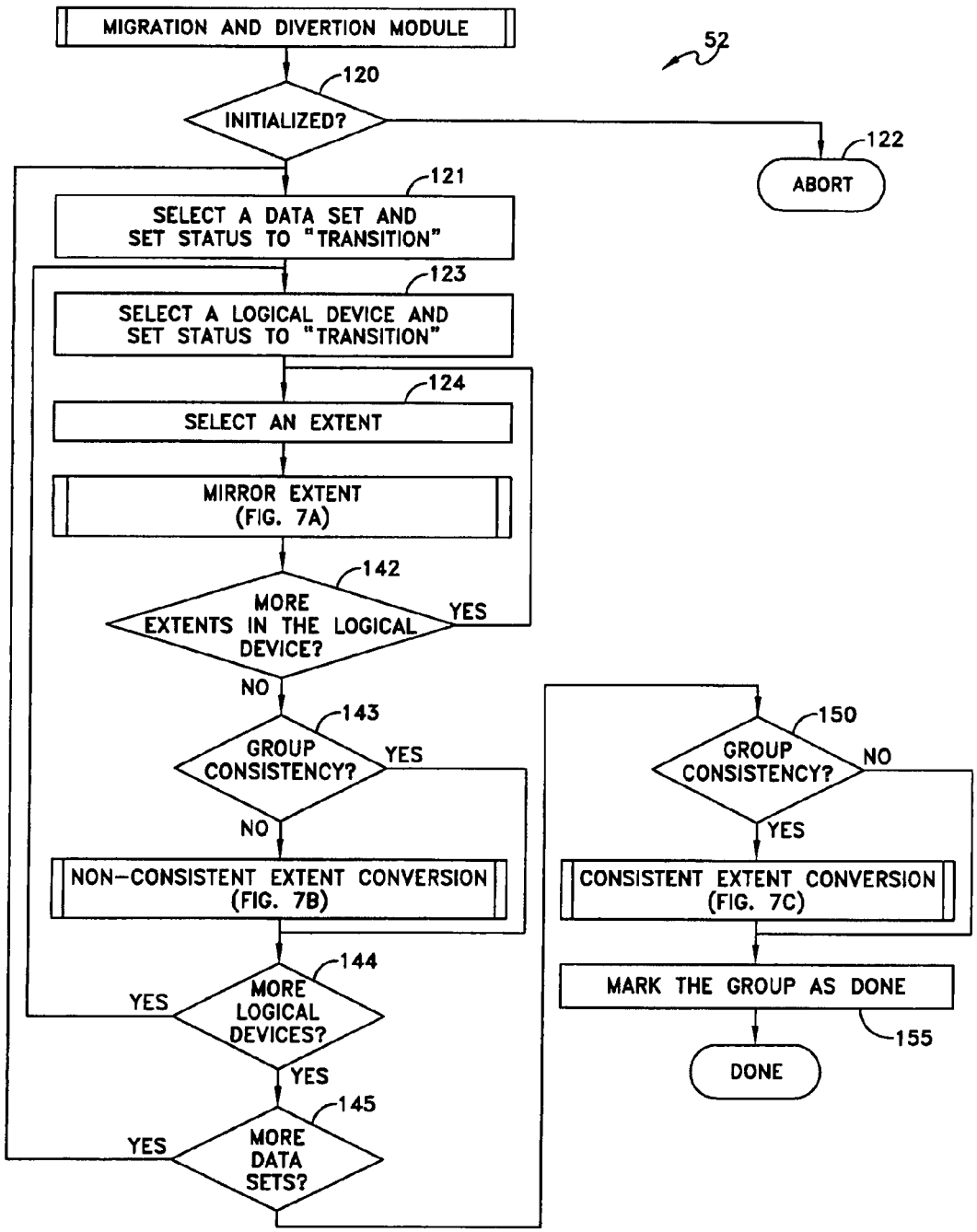
FIG. 7 constitutes a flow diagram of the operation of a migration and diversion module shown in FIG. 3.

FIG. 7 generally depicts the operation of the migration and diversion module 52 by which the migration of data occurs on an extent-by-extent and logical device-by-logical device basis for each data set involved in a data migration. The process begins at step 120 to verify the initialization module 51 has completed the initialization phase. If the initialization phase has been completed, step 120 transfers to step 121 to initiate the remaining steps of the migration and diversion module. Otherwise step 120 transfers control to step 122 that generates an abort message and the migration and diversion phase ends.

Step 121 selects a data set and changes the data set status entry, such as the entry 82 of FIG. 6, to a TRANSITION value. Step 123 performs a similar operation by selecting a logical device in the data set and setting its logical device status entry to a TRANSITION value. The TRANSITION value denotes that the logical device is undergoing a transition to a MIGRATED state.

Figure 7A:
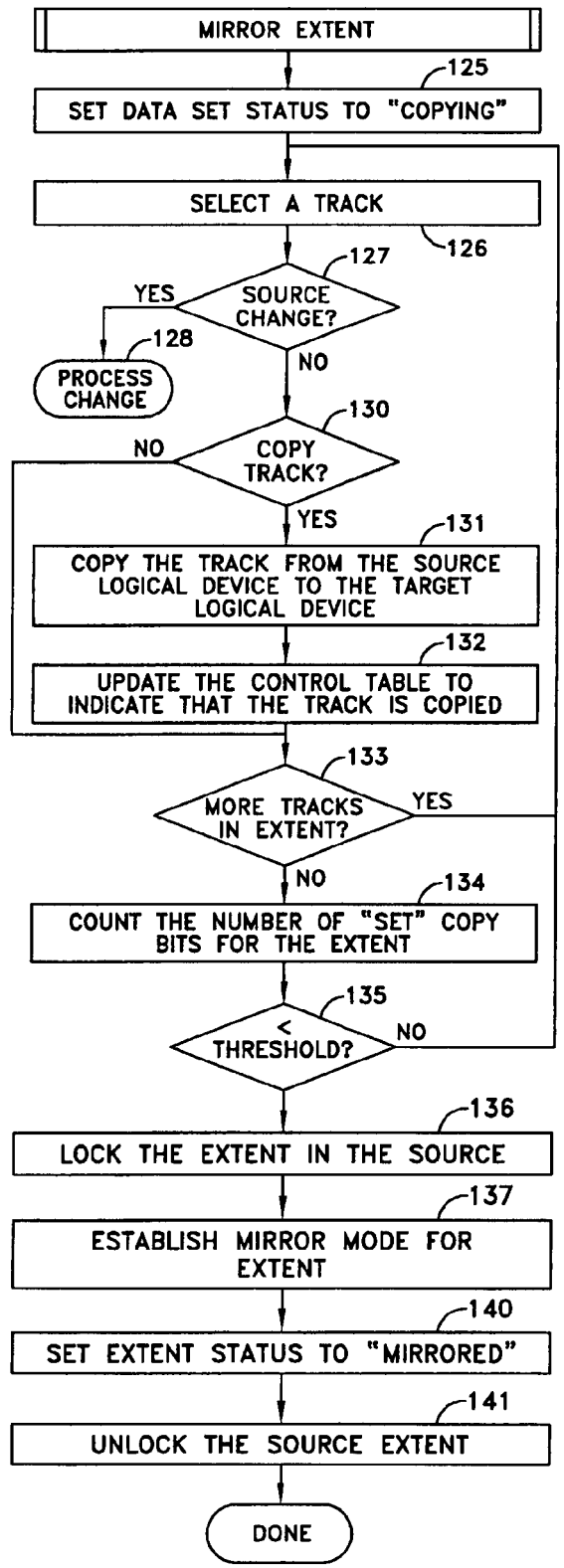
FIGS. 7A, 7B and 7C are more detailed flow diagrams of operations shown in FIG. 7.

Next step 124 selects an extent, such as the extent represented by block 90, to be mirrored. As shown in FIG. 7A, step 125 is a first step in a "mirror extent" processes. Step 125 sets the extent status entry, such as entry 91, to a COPYING value to indicate that the extent is being copied to the target logical device. If an extent is not defined by one or more complete cylinders, step 126 selects a track in the extent. Step 127 determines whether any external operations have changed the source extents based upon information acquired by the monitor module 54 in FIG. 3 or other resources. If a change has occurred, the migration and diversion phase ends through a procedure 128 that processes the change. Otherwise control transfers to step 130.

Step 130 looks to the source control block 94 to identify the specific source track for the identified track in a track row. If the corresponding COPY bit in column 101 is set, step 130 transfers to step 131 to copy the data in the source logical device track to a corresponding track in the target logical device as defined by the track address in the control block 94. Step 132 alters the state of COPY bit and or SYNC bit, depending upon the specific implementation, in the track cylinder control blocks 94 and 95 to indicate that the track has been copied. After step 132 performs its function or if step 130 determines a selected track has already been copied, control transfers to step 123. If more tracks exist in the extent, step 133 returns control to step 126 to select a next track. Alternatively, if the selected extent in the data set is defined at the cylinder level, steps 130 through 132 can be modified to establish the various operations at a complete cylinder level rather than at a track level.

When an extent has been processed in this loop, step 133 transfers control to step 134 that counts the number of set COPY bits, or SYNC bits, for the extent existing in the source logical device control block 94. As will be described later, a user application can alter data in the extents during the COPYING state. Consequently, at the end of a pass through the loop, it is possible that copied tracks have been changed. So the data in the changed tracks must be copied again. Step 134 determines how many tracks need to be recopied. If the number of tracks is at or above a particular threshold as established in the threshold block 77 of FIG. 6, step 135 returns control to step 126 to process the extent again by selecting a track.

This loop comprising steps 126 through 135 continues until a predetermined condition has been reached; in this specific embodiment, the predetermined condition is reached when the number of tracks requiring copying reduces to a value that is below the threshold. Then step 135 transfers control to step 136 in FIG. 7A that is a first step in a process for synchronizing the data in the target logical device extent to the data in the source logical device extent.

This is a serialized process, so step 136 locks the extent in the source logical device to prevent any interaction between applications and the source logical device extent. Step 137 then completes the mirroring operation by transferring the data from any remaining changed tracks to the target logical device. As will be obvious, no interaction with any host application can occur during this interval. When this step has completed, data in the extent of the target logical device mirrors the data in the corresponding extent of the source logical device. Step 140 updates the extent status in a corresponding extent status entry, like the entry 91, to a MIRRORED value indicating that synchronism has been achieved for that extent. Step 141 then unlocks the source extent to re-enable communications between the host and the extent.

After step 141 unlocks the extent, it is again available to user applications. Then control returns to FIG. 7, particularly step 142. If there are more extents in the logical devices, step 142 transfers control to step 124 to repeat the process for mirroring the next extent.

When all the extents in a data set have been transferred, step 142 in FIG. 7 transfers control to step 143 that determines whether the migration is being performed in a consistent fashion. Specifically, step 143 tests the consistency argument in the LDM command. If the argument is valid, the diversion to data migrated to the target logical device or devices is to occur at the same time. In that case, step 143 transfers to step 144 to determine if additional data set extents in other logical devices need to be processed. If extents in additional logical devices for a data set need to be processed, step 144 transfers control back to step 123 to select another logical device containing extents for the selected data set. If all the logical devices have been processed, step 144 transfers control to step 145 to see if extents in additional data sets need to be processed.

Figure 7B:
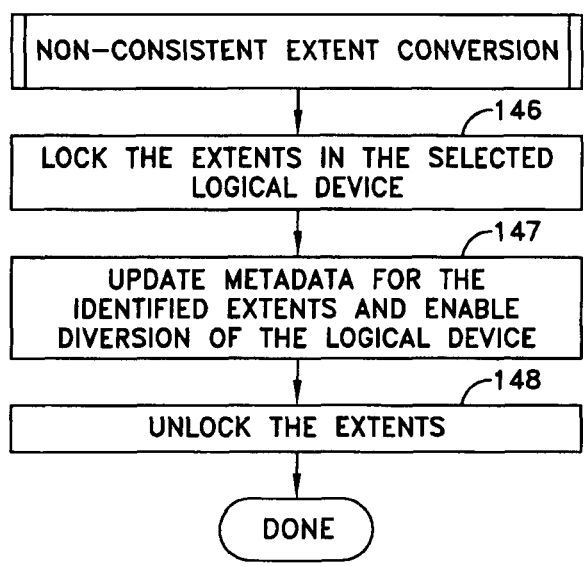

If group consistency is not required, step 143 transfers control to initiate a serialized "non-consistent conversion" process as shown in FIG. 7B where step 146 locks the extents in the selected logical device. Step 147 then updates the metadata for the identified data set extents in the logical device. Step 147 also sets status for the data set to indicate a DIVERTED state by updating a logical device status entry, like the status entry 86 in FIG. 6, and all the corresponding extent status entries, like the entry 91. Step 148 then unlocks the source data set extents and control transfers to step 144 in FIG. 7.

When steps 144 and 145 determine that all the data sets have been completed, step 145 transfers control to step 150. Assuming the group consistency argument was not set in the LDM command, no further action is taken.

When group consistency is required, a "consistent extent conversion" process beings. As will be apparent, the none-consistent extent conversion and consistent extent conversion are mutually exclusive. Like the former, the consistent conversion is a serialized process. This process begins when step 150 transfers control to step 151 in FIG. 7C that locks all the source extents for all the data sets in the group concurrently. Step 152 then updates the metadata for all the source data sets and their extents in the designated group. Next step 153 shifts that status for all the data sets, logical devices and extents in the group to DIVERTED values by updating the extent and data set status entries, such as the entries 78, 82, 86 and 91. When this is complete, step 154 unlocks all the source extents in the group. Control then returns to step 155 in FIG. 7 to mark the identified group as DONE by updating the group status entry 78.

Figure 7C:
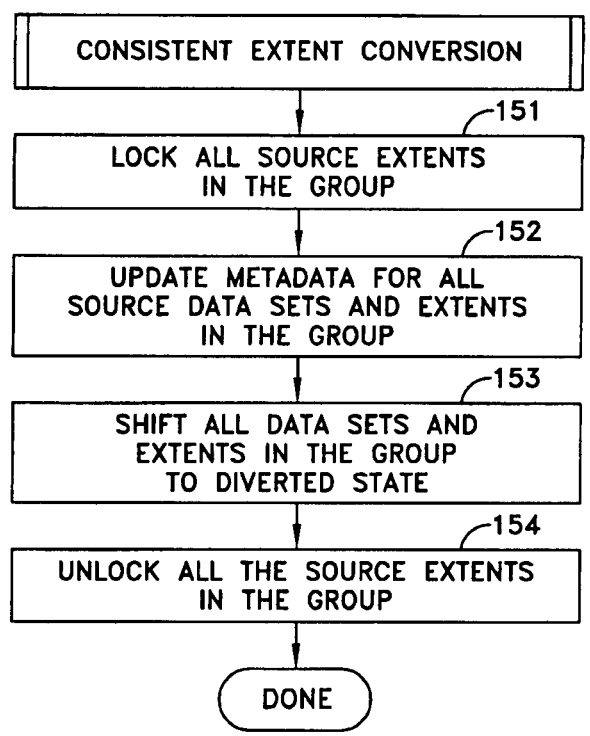

Thus when the migration and diversion module of FIG. 7, including the procedures of FIGS. 7A, 7B and 7C, completes its operation, all I/O requests are diverted to the target logical devices. Eventually the diversion process can also be terminated so the storage areas associated with the migrated data sets can be used for other purposes.

Logical Data Migration—I/O Requests

Figure 8:
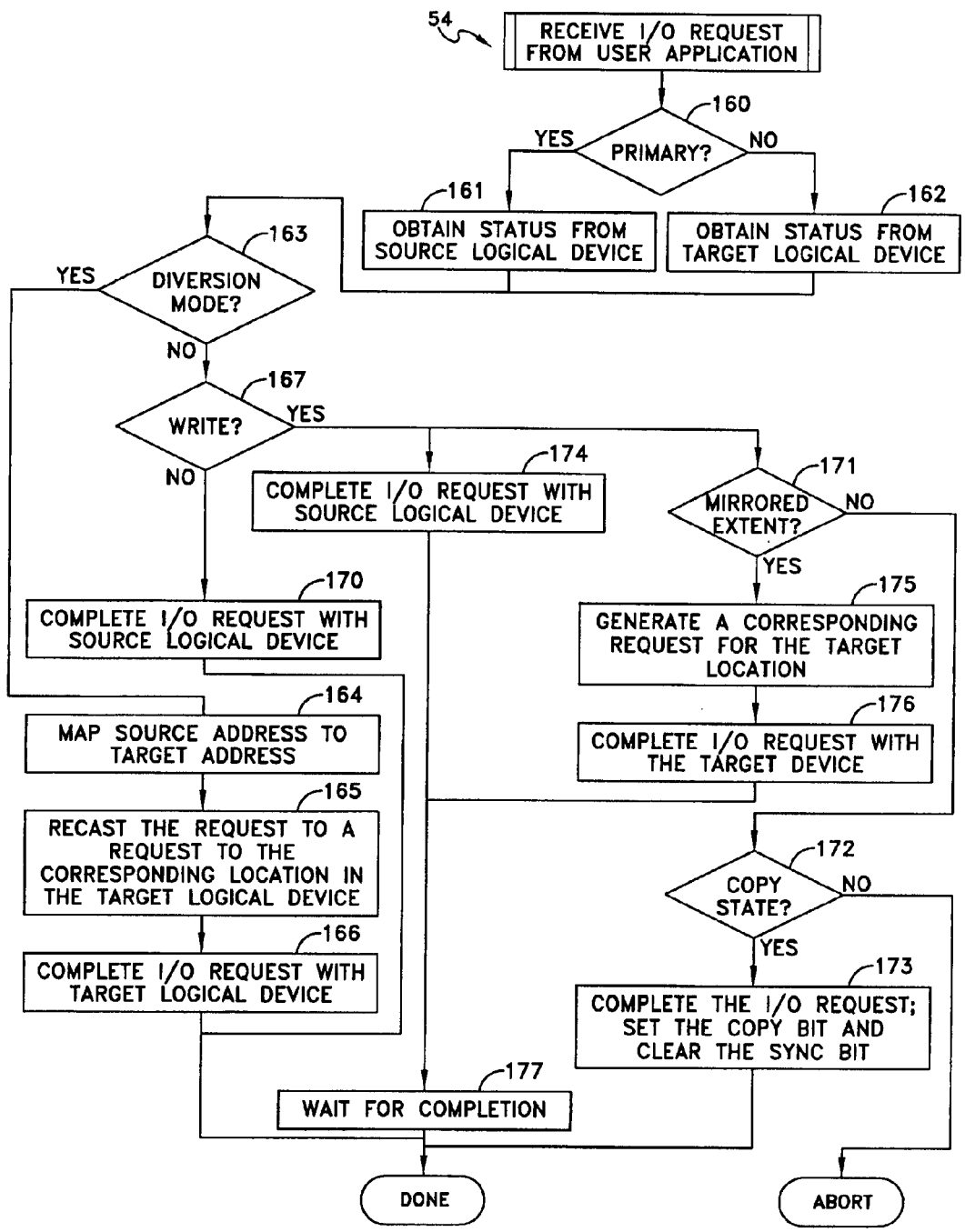
FIG. 8 is a flow diagram of the operation of a monitor module shown in FIG. 3.

To minimize the impact of making a logical data migration concurrently with the normal handling of input-output requests from host applications, it is necessary to continue to respond to I/O requests from such host applications for data even as the extents are being migrated. The monitor module 54 performs this necessary function. Such modules can operate by intercepting I/O requests for special processing by the monitor module 54 as known in the art, one example being disclosed in U.S. patent Ser. No. 10/283,976, which is incorporated by reference herein. FIG. 8 depicts the actions of the monitor module 54 in response to I/O requests from user applications, such as the USR1 application 33 or USR2 application 34 in FIG. 1.

This embodiment of the monitor module 54 also is adapted for use in systems that have multiple hosts. In a multi-host system, one host, like the host 21, is designated a "primary host" or "owner" host. An "owner" is established at group activation time as being the best host to manage the process for a particular data set group. In particular, most if not all of the actual data migration is likely to be done by the Owner. Certain command functions may only be satisfied by the owner although this may be made transparent to the user. Other hosts, such as the host 21A in FIG. 1, are "secondary" or "non-owner" hosts. The non-owner hosts must at the very least monitor I/O requests to the effected data sets and actively participate in the mirror and diversion phases. Each primary and secondary host uses an instance of monitor module 54 to intercept I/O requests while the data migration process is underway with some minor modifications. Thus, it is possible to migrate data from an extent that is accessible to applications in multiple hosts.

Assuming that the requests for a data transfer in a data set being migrated originates with the same host 21 as is processing the migration and diversion module 52 associated with the LDM application 50, step 160 transfers control to step 161 to obtain status, address and other information from the source logical device data structures. Step 160 is representative of the process that monitors operations including the monitoring of changes that is useful in step 127 of FIG. 7A. If the monitor module is operating as a secondary host, step 160 transfers control to step 162 thereby to obtain status and other information from the control block 95 in the target logical device. Step 162 is analogous to step 161. Once this information has been obtained, control transfers to step 163.

Step 163 determines whether the I/O request is directed to a track in a diverted extent as indicated by a corresponding extent status entry, such as in the extent status entry 90 in FIG. 6. If it is, step 163 in FIG. 8 transfers to step 164 that utilizes the status and other information in FIG. 6 to convert the source track address to a target track address. Step 165 recasts the received I/O request to a request to the corresponding location in the target logical device. Step 166 completes this I/O request with the target logical device. No transfer occurs with the track in the source logical device.

During the transition to the DIVERTED state, individual extents exist in either the COPY or MIRRORED states. In that event step 163 transfers to step 167 to determine whether an I/O request includes any write commands. If the I/O request contains only read commands, control transfers to step 170 to retrieve the requested data from the source logical device. There is no need for a read command to interact with an extent in the target logical device prior to the shift to a DIVERTED state. Then the response to the read-only I/O request is complete.

If a write command to an extent is included in an I/O request prior to the shift of the extent to the DIVERTED state, each write command must be handled in a way that assures each identified track in the target logical device remains synchronized to the source logical device track. If the extent is in a COPY state, steps 171 and 172 transfer control to step 173. In this step, the monitor module 54 uses step 174 to complete each write command by updating only the identified tracks with the source logical device. However, step 173 updates the COPY bit and SYNC bit to states indicating that the track needs to be copied again. As a result, the changed data will be transferred to the target logical device thereafter. This completes the response to a write operation involving an extent in the COPY state.

If the extent being written is in the MIRRORED state, step 174 again completes the request for the source logical device. In parallel, step 171 transfers control to step 175 to generate a request to the target logical device using the available mapping data. Step 176 completes the request to the target logical device by writing the data to the corresponding track in the target logical device. Consequently if data is written to a MIRRORED extent the operation of FIG. 8 assures that the changed data sent to the two effected tracks remain identical. For either write operation, step 177 represents an action of waiting for the completion of both parallel processes before indicating that the write operation has been completed.

When the metadata for a data set, or in the case of a consistent group all the data sets being migrated, is updated, all the information necessary to identify the configuration and addresses of the data sets is altered to point to the new locations in the target devices at one time. While any application is open, however, the diversion operation of FIG. 8 continues. However, when an application is stopped and then started, i.e., is recycled, after the data set extents in a logical device are in a DIVERTED state, the application opens the data set with the new or updated metadata based on the various information available concerning storage locations, such as catalog, VTOC and other tables. Thereafter read/write requests from that application directly interact with the target device. There is no further requirement for interaction with the source logical device or for the operation of the monitor module functions shown in FIG. 8.

Logical Device Migration—Termination Phase

Figure 9:
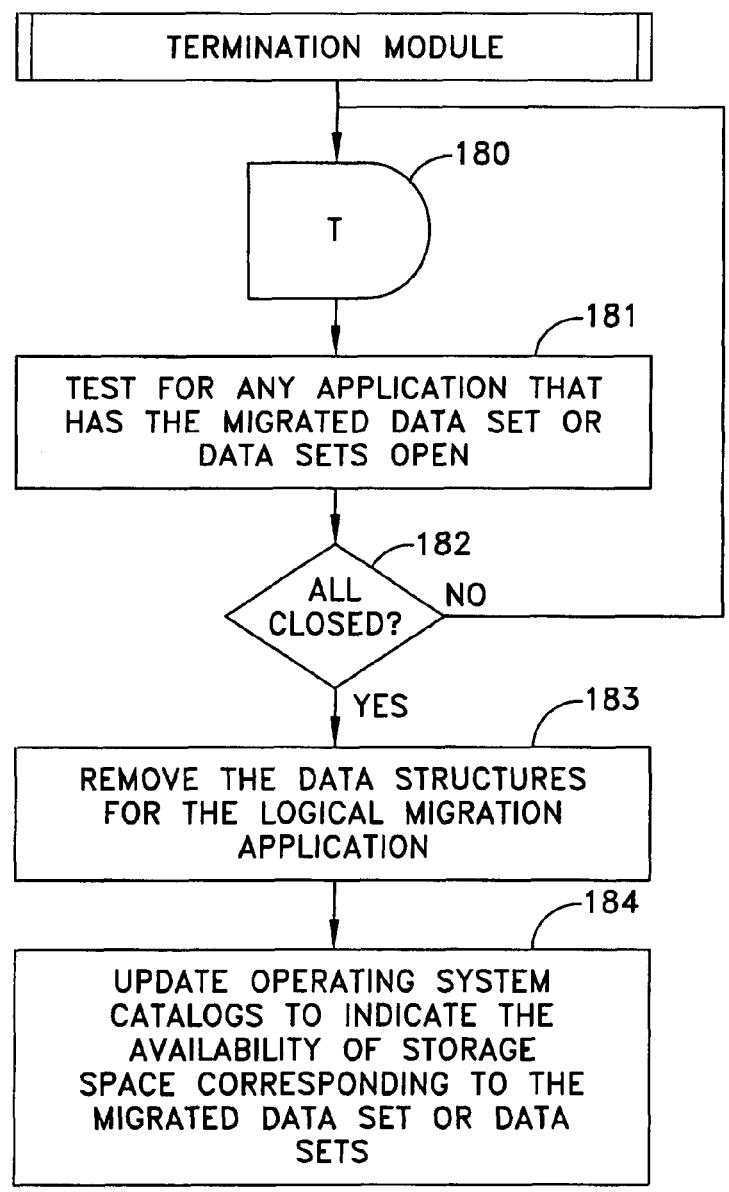
FIG. 9 is a flow diagram of the operation of a termination module shown in FIG. 3.

When all applications that were running at the time of the data migration have terminated once after a migration, there is no requirement to retain the source data sets. When this condition exists, the system can enter the termination phase. As shown in FIG. 9, the termination module 53 includes a delay 180 that might be used during the process. Step 181 tests to determine whether any application started before the data migration continues to run. If not all the applications have recycled, step 182 transfers control back to step 180 to wait for some arbitrary time before trying this test again. In some situations it may become necessary to terminate and immediately restrict any application that had been initiated prior to the logical data migration in order to complete the termination process.

In either event, when all applications that were interacting with data during the logical data migration have been closed once since the migration has been completed, step 183 can remove the data structures for the logical migration application, such as the data structure shown in FIG. 6, from all related areas of the data processing system. Step 184 then can update the VTOC or any equivalent data structure to make the locations for the migrated source extents available for other purposes.

The foregoing description relates to a specific embodiment of a method and apparatus for migrating one or more data sets from one or more source logical devices to one or more target logical devices. The data migration may involve a single data set of a single extent or multiple extents. Further, the data migration may involve groups of data sets with the option of performing the transfer of all the data sets in a group in a consistent manner. In whatever form, the migration is transparent to other applications that may be using the data concurrently. The process involves only minimal interruption in data processing by such user applications.

The various objectives of this invention are realized by means of the utilization of a logical data migration application that responds to a command. The command identifies all the extents to be migrated in a source logical device and locations in the target logical device to receive those extents. As there is a corresponding address in the target logical device for each extent in the source device, it is possible for diverse extents and data sets to be transferred to a single logical device, unlike prior art data migration systems. At initialization the process generates and populates various control data structures. During migration and diversion, the application copies extents on a track-by-track or cylinder-by-cylinder basis for one or more source logical devices to one or more target logical devices based upon address information in the control data structures. During these operations, a monitor module responds to I/O requests from other applications to the extent in this phase by processing the request and, in the case of write operations, updating the information in the control data structures.

During migration and diversion each extent in the target logical device is mirrored from the corresponding extent in the source logical device in a serialized process. During this process a lock is placed on the extent being mirrored for the duration of time to copy any as yet un-copied tracks to the target device without interruption by a user application. As the serialize process acts on extents, the likelihood that the interruption will effect an application is minimized. After an extent is mirrored, the monitor function responds to write requests by updating both the source and target logical devices.

After the data set extents in a logical device or a group of data set extents in multiple data sets have been mirrored, the migration and diversion module shifts each extent to a DIVERTED state, the timing of which is dependent upon the requirement for group consistency. After the data set extents in a logical device are diverted, the monitoring function intercepts all I/O requests and recasts them to a target address and reissues the request.

This diversion operation continues to handle all I/O requests from any application until such time that application closes a data set. When the application opens that data set again, I/O requests will be directed to the target logical device because at the time of the diversion all the metadata related to the diverted data sets is updated.

This invention has been disclosed in terms of certain embodiments. It will be apparent that many modifications can be made to the disclosed apparatus without departing from the invention. For example, this invention has been described with respect to a specific implementation of the invention in a Symmetrix data storage facility available from the assignee of this invention. However, the basic functions that implement the logical data migration of this invention are readily adapted for other types of data storage facilities. The disclosure additionally includes specific references to organizations of the logical data migration modules such as shown in FIG. 3 and specific sequences of operations as shown in FIGS. 4, 5, 5A, 7, 7A, 7B, 7C, 8 and 9. Variations in these sequences and the specific functions of each particular step may be altered to implement the invention with another type of data storage facility or for the purpose of integrating the logical data migration system with other applications or for utilizing existing utilities such as available in commercially available operating systems. Further, the invention has been described in terms of a specific transfer between two logical devices and a source data storage facility and a single logical device in a target data storage facility. The invention is equally applicable to performing migrations within a single data storage facility.

It will be apparent that FIG. 6 depicts a specific data structure and organization. Persons of ordinary skill in the art will have the knowledge to implement this specific structure and organization or to adopt other structures and organizations for implements the specifically disclosed structures and organization.

It is useful to have metrics to determine when to dynamically reconfigure a system to migrate data from one or more logical devices to a different one or more logical devices as described above. Although in some cases the decision to migrate data may be made in accordance with phasing out old hardware, in other instances it may be useful to migrate data when the performance of the device(s) on which the data is stored is not meeting expectations.

The IBM Corporation provides DFSMS, which allows allocation of data sets based on criteria that is input when the data set is created. For example, if a user is interested in having a particular performance for a data set (e.g., a particular millisecond response time), then a user would input the desired performance characteristic to DFSMS and would automatically be allocated an appropriate storage device that is supposed to meet or exceed the desired performance characteristics. However, there are limitations to this system. In the first place, if after the initial allocation the storage device does not meet the performance requirements, there is no mechanism readily available in DFSMS to reallocate an already allocated data set while the data set is also being accessed by another application. In such a case, a user would notice a performance shortfall, manually allocate a new data set space on a different device, terminate all applications accessing the data set, and move the data from the old data set space on the old device to the new data set space on the new device. In addition, sometimes the desired performance of a data set changes. For example, a user may initially allocate a data set with a four millisecond response time. Later, the user may decide that a three millisecond response time is more appropriate, either because of changing circumstances or because the user underestimated the performance needs. Just as with the previous example, a user would notice a performance shortfall, manually allocate a new data set space on a different device, terminate all applications accessing the data set, and move the data from the old data set space on the old device to the new data set space on the new device.

Accordingly, it is desirable to be able to automatically monitor data set performance and reallocate data sets when performance is not appropriate. It would also be desirable to be able to automatically reallocate data sets based on any other appropriate criteria, such as data management objectives.

Figure 10:
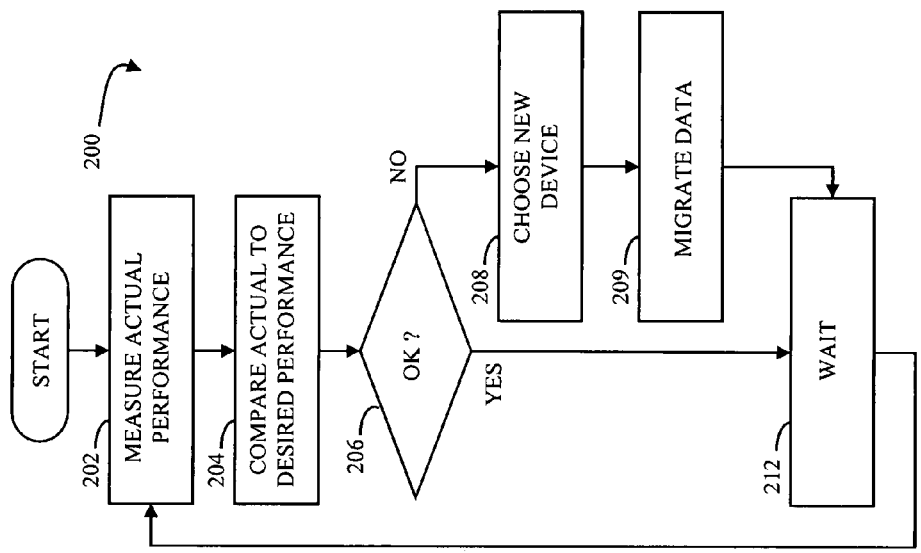
FIG. 10 is a flow diagram illustrating deciding whether to perform dynamic data set migration.

Referring to FIG. 10, a flow diagram 200 illustrates steps performed in connection with the system described herein that automatically monitors data set performance and reallocates (moves) data sets to different devices when appropriate. Note that, in some instances, data sets may be spread across more than one device. Thus, it is possible to move only a portion of a data set (e.g., a portion on a particular device) without moving other portions. Accordingly, for the discussion herein, it is understood that reallocating (moving) a data set also refers to reallocating (moving) only a portion of a data set.

Processing begins at a first step 202 to measure the actual performance of the storage device on which a data set is stored. Measuring storage device performance is fairly straightforward and involves, for example, recording performance characteristics that are either provided directly by the device or ascertaining characteristics based on other values associated with the storage device. Possible performance characteristics that may be used are described elsewhere herein.

Following the step 202 is a step 204 where the actual performance, measured at the step 202, is compared with the desired performance to determine if the actual performance meets or exceeds the desired performance. Note that, as used herein, "performance" may be understood broadly to include data management objectives (e.g., type of remote mirroring used), as described elsewhere herein. Like the step 202, the step 204 is fairly straight-forward. As described in more detail elsewhere herein, a set of desired performance characteristics may be associated with each data set and/or a group of data sets. Following the step 204 is a test step 206 which determines if the result of the comparison of the step 204 is okay (i.e., the actual performance meets or exceeds the desired performance). If the result of the comparison is not okay, that is, if the actual performance does not meet or exceed the user's desired performance, then control passes from the test step 206 to a step 208 where a new device for the data set is chosen. Choosing a new device at the step 208 is described in more detail elsewhere herein. Following the step 208 is a step 209 where the data is migrated, as described elsewhere herein.

Following the step 209 or following the step 206 if the actual performance meets or exceeds the desired performance, is a step 212 where the processor waits. The step 212 is optional, but may be used beneficially to control the timing of the loop in the flow diagram 200. Following step 212, control transfers back to the step 202, discussed above.

Referring to FIG. 11, a flow diagram 220 illustrates in more detail the step 208 of the flow diagram 200 FIG. 10 where a new device is chosen. Processing for the flow diagram 220 begins at a first step 222 where a device index, DI, is set to one. The device index, DI, is used to iterate through all of the possible storage devices that may be selected. Following the step 222 is a step 224 where a criteria index, CI, is set to one. The criteria index, CI, may be used to iterate through all the possible criteria to determine which devices do, or do not, meet or exceed the desired criteria.

Following step 224 is a test step 226 which determines if the device index criteria, DI, exceeds some predetermined value (referred to as DIMAX at the step 226) corresponding to the number of possible devices. If so, then control transfers from the step 226 to a step 228 where an error is posted. Note that if the device index, DI, exceeds the number of possible devices, then there is no device that meets the desired criteria. Thus, an error is posted at the step 228 to alert the calling routine that no device is acceptable. Following step 228, processing is complete.

If it is determined at the test step 226 that DI is not greater than the number of devices, then control transfers from the test step 226 to a test step 232 to determines if the criteria index, CI, exceeds a predetermined number (CIMAX) that corresponds to the number of possible criteria. If so, then control transfers from the step 232 to a step 234 where the routine returns the particular device being examined, referred to as DEV[DI]. Note that if the system iterates through all of the criteria and the particular device being examined, DEV[DI], meets or exceeds each of the criteria, then CI will continue to be incremented until CI exceeds the number of possible criteria (CIMAX), in which case the device DEV[DI] has met or exceeded all of the desired criteria. Following the step 234, processing is complete.

If it is determined that the test step 232 that the criteria index, CI, does not exceed the number of possible criteria, then control transfers from the test step 232 to a test step 236 where it is determined if the device being examined DEV[DI] meets or exceeds the particular criteria CRIT[CI]. If so, then control transfers from the test step 236 to a step 238 where the criteria index, CI, is incremented. Following the step 238, control transfers back to the test step 232, discussed above.

If the device DEV[DI] does not meet the particular criteria CRIT[CI] at the step 236, then control transfers from the step 236 to a step 242 where the device index, DI, is incremented. Thus, the step 236 rejects any devices that do not meet all of the desired criteria. Following step 242, control transfers back to the step 224 where the criteria index, CI, is set to one to begin iterating through the criteria for another device. Thus, the steps of the flow chart 220 are executed until either there are no devices that meet all of the desired criteria, as evidenced by the step 228, or there is at least one device that meets all the desired criteria, as evidenced by the step 234. Thus, either the step 228 is reached, indicating that there are no devices that meet the desired criteria, or the step 234 is reached indicating that there is at least one device that meets all of the desired criteria.

In addition to the millisecond response time criteria discussed above in connection with DFSMS, other criteria may be used to select a storage device for a data set or group of data sets. The other criteria include read performance time, write performance time, control performance time, mirror performance time (i.e., the performance of a mirror for a logical device), connectivity type to the storage device (e.g., FICON, ESCON, parallel channels, IP attached storage, etc.), local mirroring type (e.g., RAID 1, RAID 5, RAID 10, etc.) remote mirroring type (e.g., J0/J1 RDF, adaptive copy RDF, SRDF/A, SAR, STAR, PPRC (with variations), etc.), maximum data set size, date dependant performance, back-up frequency, and number of back-ups. Note that, as used herein, "performance" may be understood broadly to include data management objectives (e.g., type of remote mirroring used). Thus, the performance criteria could be broadly understood to include things like mirroring type or maximum data set size. Generally, the performance criteria can be any desired characteristic of the system that may be ascertained and that may differ between storage devices on which the data set may possibly be placed.

Appropriate mechanisms may be used to measure the performance at the step 202 and compare the performance at the step 204. Thus, for example, if the criteria of frequency of back-ups is used, the actual performance measure at the step 202 is the frequency of back-ups for a particular storage device while the value compared at the step 204 with the actual criteria 202 is the desired frequency of back-ups provided by a user for a particular data set or group of data sets. Similarly, if the criteria is connectivity type, then the actual performance measured at the step 202 is the actual connection to a storage device which is compared at the step 204 with the connectivity type desired by the user (e.g., ESCON) for a data set or group of data sets. Measuring these different criteria and comparing these different criteria to the actual criteria is straightforward to one of ordinary skill in the art. Any other appropriate criteria may be used. Note that the desired performance associated with a data set or group of data sets may itself be stored in a data set or otherwise maintained by some other appropriate means. Similarly, the measured actual performance may also be stored in a data set or maintained by some other appropriate means.

The system described herein may be used with DFSMS using a parallel set of classes similar to the set of classes provided by DFSMS. There may be other mechanisms used as hooks to provide the functionality described herein with DFSMS. It is also possible to implement the system described herein without using DFSMS by providing a mechanism where a user may specify performance/management rules that the system uses to determine whether to migrate any data sets.

Figure 12:
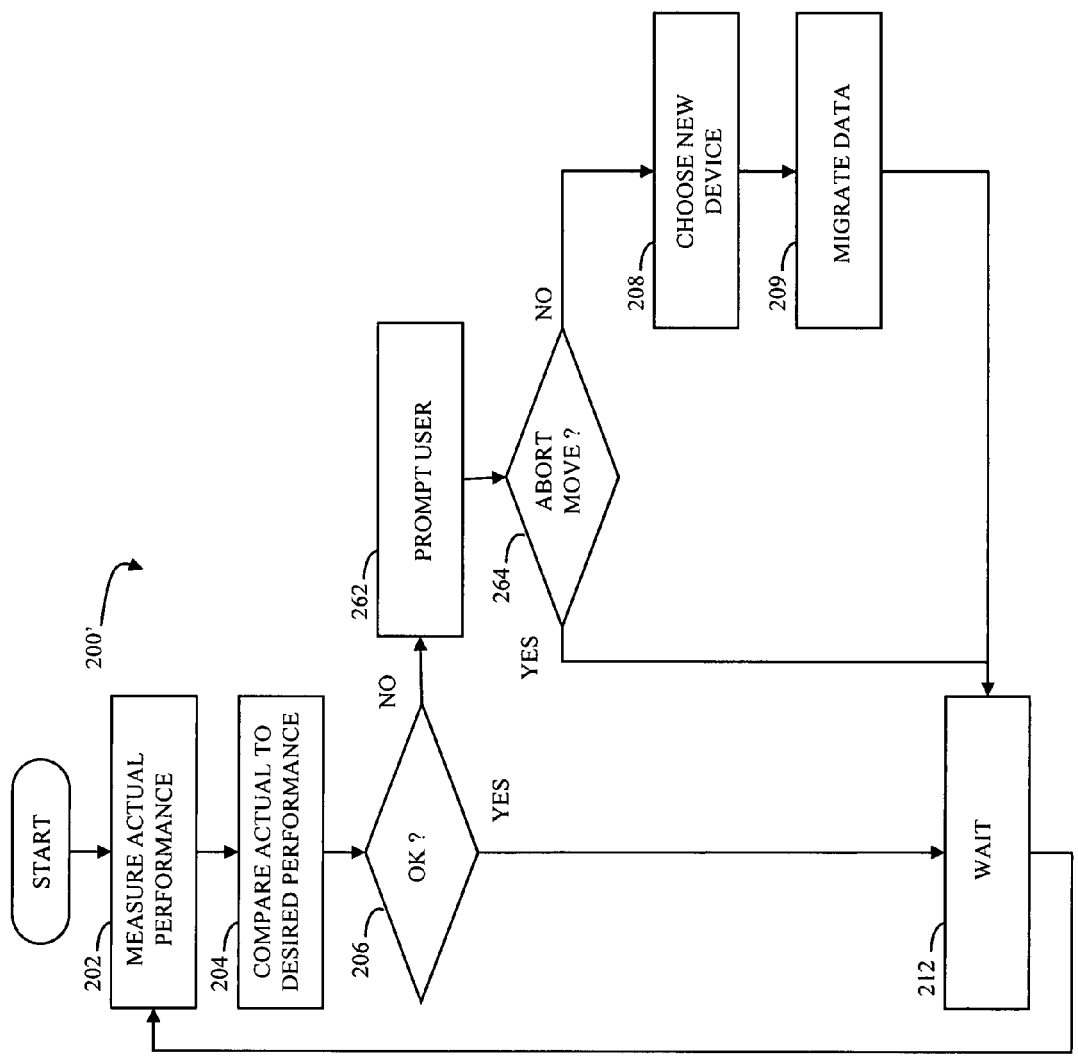
FIG. 12 is a flow diagram illustrating an alternative embodiment for deciding whether to perform dynamic data set migration.

Referring to FIG. 12, a flow chart 200' illustrates an alternative embodiment of the processing illustrated by the flow chart 200 of FIG. 10. In the embodiment illustrated by the flow chart 200' of FIG. 12, the user has the option of aborting the move even though the system has detected that the desired performance (or data management characteristics) has not been met. Elements of the flow chart 200' having the same reference number as elements of the flow chart 200 perform analogous functions and thus are not described below.

If it is determined at the test step 206 (described above) that the result of the comparison of the step 204 is not okay, then control passes from the step 206 to a step 262, where the user is prompted to confirm that the data set should be moved. Following the step 262 is a test step 264 which determines if the user has decided to abort moving the data set. If so, then control passes from the step 264 to the step 212, discussed above. Otherwise, if the user chooses not to abort the move, control passes from the step 264 to the step 208, discussed above. In some instances, it may be desirable to set a flag to prevent the user from being prompted too often (or ever again) after the user has initially indicated that the data set is not to be moved.

Note that it is possible in some embodiments to provide a mechanism that allows a user to request selective monitoring of a subset of devices and/or data sets. Such a mechanism could be provided in any number of ways, including using configuration files that are accessed by the system, prompting a user, etc.

In some cases, there may be a concern that data on a disk or tape or other medium could be compromised, especially in instances where the data includes personal records of thousands of customers. In some situations, it is desirable to provide data encryption without having to modify any applications that use the data. As described in more detail below, it may be possible to use the data migration mechanism discussed herein to provide such application-independent encryption.

Figure 13:
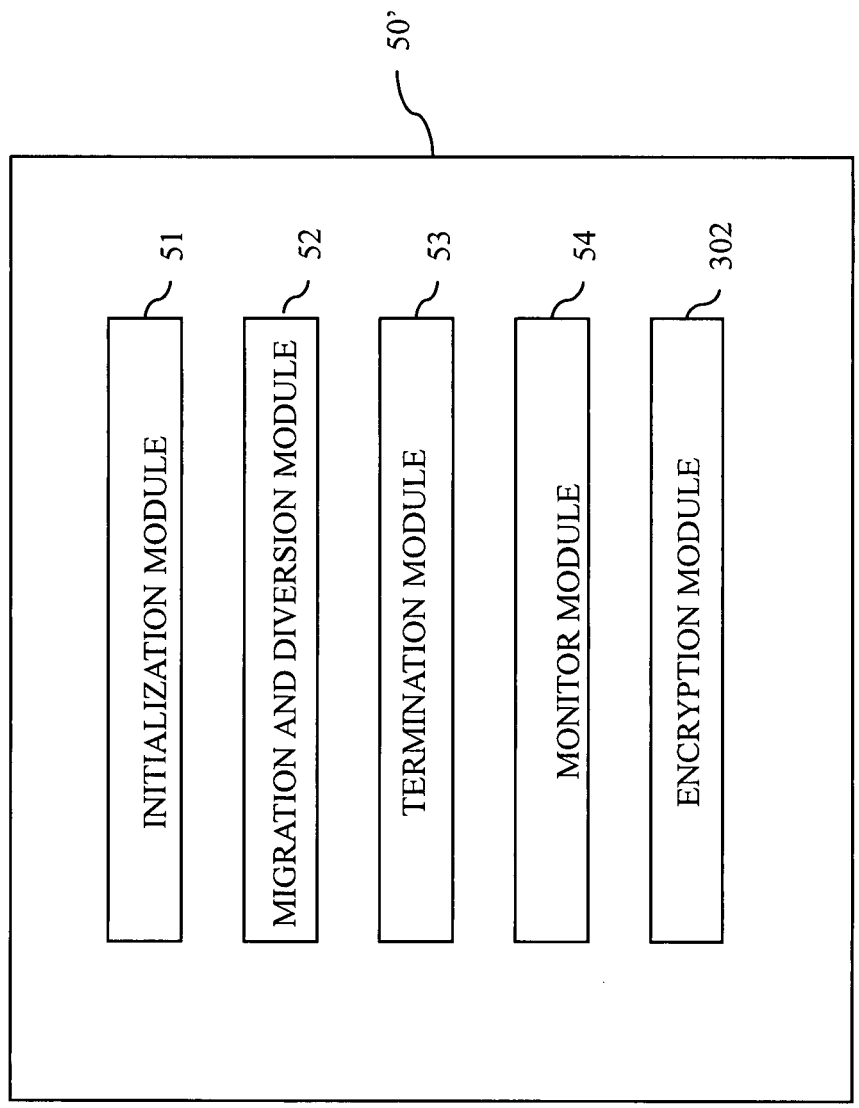
FIG. 13 is a block diagram of the organization of an alternative embodiment of a logical migration application that operates in accordance with this invention.

Referring to FIG. 13, a data migration application 50' is like the data migration application 50 of FIG. 3 in that the application 50' contains an initialization module 51, a migration and diversion module 52, a termination module 53, and a monitor module 54. The application 50' may also contain an encryption module 302 that may be used to encrypt data as the data is migrated. However, as discussed elsewhere herein, data may also be encrypted without being migrated to another location. The system described herein may provide encryption/decryption to or from any type of storage medium or device, including disk storage, tapes, DVD's, etc.

In an embodiment herein, the encryption module 302 may use generally known and publicly available encryption/decryption algorithms. For example, the algorithm may be one in which the encryption key is publicly known and available while the decryption key is kept secret by one or more entities that use the decryption key to decrypt data. For such encryption/decryption systems, knowledge of the public encryption key does not provide access or knowledge of the decryption key and/or of the unencrypted text. Examples of such encryption/decryption techniques include the public key encryption provided by RSA Systems of Bedford, Mass.

Other systems may be used for encryption/decryption. For example, the encryption/decryption may be provided by one or more systems that use the IBM Common Cryptographic Architecture (CCA), such as the S/390 system provided by IBM. Other systems may be used that do not rely on any public keys but, instead, use only private keys. For such systems, the measures applied to prevent compromise of the key(s) when decrypting may also be applied to the key(s) when encrypting.

Referring to FIG. 14, the encryption module 302 is shown in more detail as having an input for providing clear (unencrypted) data to the encryption module 302. The encryption module 302 also receives as input an encryption key. As discussed elsewhere herein, the encryption key may be publicly known and available and thus may not require any special handling or vaulting. FIG. 14 also shows an output of the encryption module 302 being the encrypted data. In operation, unencrypted data is provided as an input to the encryption module 302 along with the encryption key. The encryption module 302 may use any one of a number of the well-known and publicly available public key encryption algorithms to encrypt the data.

Referring to FIG. 15, a flow chart 310 illustrates steps performed in connection with a portion of the data migration when data migration is coupled with encryption as described herein. The steps of the flow chart 310 may be performed in connection with the step 131 of the flow chart of FIG. 7A where tracks are copied from a source logical device to a target logical device. The steps of the flow chart 310 may also be performed in connection with the step 137 of the flow chart of FIG. 7A. At the step 137, remaining data is copied from the source logical device to the target logical device in connection with data migration.

Processing for the flow chart 310 begins at a first step 312 where an encryption key is obtained. As discussed elsewhere herein, it is possible to use public key cryptography where the encryption key is publicly available and well-known and does not need to be vaulted or kept secret. Following the step 312 is a step 314 where the encryption key is applied to the data being copied from the source logical device to the target logical device. Following the step 314 is a step 316 where the encrypted data is provided to the target logical device. Following the step 316, processing is complete.

As discussed elsewhere herein, decrypting the thus-encrypted data may be a little more involved since the decryption key should be kept secret. As discussed elsewhere herein, there are a number of techniques for maintaining the secrecy of the decryption key. For the system described herein, the decryption key is maintained within the storage device that stores the data or is maintained with the data migration application so that if a malicious (unauthorized) user were to copy the encrypted data onto a tape or other medium or to remove one or more drives from the storage device, the encrypted data would be unusable because the decryption key is maintained with the storage device or data migration application and thus may only be used by authorized users. Mechanisms that may be used for implementing this are described elsewhere herein.

Referring to FIG. 16, a flow chart 320 illustrates steps that may be performed in connection with decrypting data. Processing begins at a first step 322 where the data is decrypted using the secret/private key. Decrypting the data at the step 322 is described in more detail elsewhere herein. Following the step 322 is a step 324 where the decrypted data is provided to the authorized user of the storage device. Following the step 324, processing is complete.

Note that the functionality described herein may be implemented in connection with a data migration to another location, an "in-place" data migration (described elsewhere herein), or as part of the storage process for one or more volumes, files, and/or any other type of storage unit. For example, a user may create a particular logical volume for storing sensitive data and may configure the system to always encrypt data stored to that volume. In that case, the system will cause data written to that volume to be encrypted and will cause data to be read from that volume (by an authorized user) to be decrypted. As described elsewhere herein, the encryption/decryption may be performed in a manner that is transparent to an application running on a host. For example, the encryption/decryption functionality may be provided on the storage device. Alternatively, the encryption/decryption functionality may be provided on one or more hosts using process(es) that intercept host reads and writes from and to the storage device in order to perform the encryption and decryption.

Figure 17A:
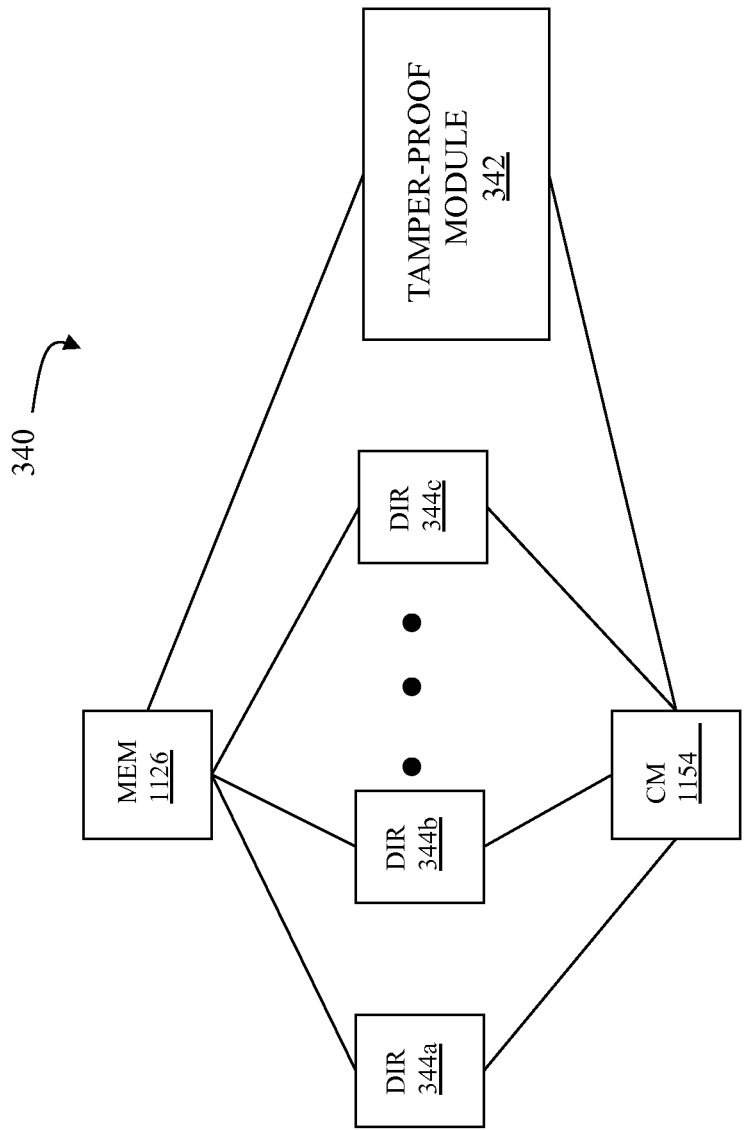
FIG. 17A is a diagram that illustrates an embodiment where a storage device includes a tamper-proof module.

Referring to FIG. 17A, a diagram 340 illustrates an embodiment where a storage device includes a tamper-proof module 342. The diagram 340 also shows a plurality of directors 344a-344c that are coupled to a memory 346 that is internal to the storage device. Each of the directors 344a-344c may represent a host adaptor, a disk adaptor, and/or a remote adaptor. In an embodiment herein, there may be up to sixteen directors coupled to the memory 346. Of course, for other embodiments, there may be a higher or lower maximum number of directors that may be used.

The diagram 340 also shows an optional communication module (CM) 348 that provides an alternative communication path between the directors 344a-344c and/or the tamper-proof module 342. Each of the directors 344a-344c and/or the tamper-proof module 342 may be coupled to the CM 348 so that any one of the directors 344a-344c and/or the tamper-proof module 342 may send a message and/or data to any other one of the directors 344a-344c and/or the tamper-proof module 344 without needing to go through the memory 346. The CM 348 may be implemented using conventional MUX/router technology where a sending one of the directors 344a-344c and/or the tamper-proof module 342 provides an appropriate address to cause a message and/or data to be received by an intended receiving one of the directors 344a-344c and/or the tamper-proof module 342. In addition, a sending one of the directors 344a-344c and/or the tamper-proof module 342 may be able to broadcast a message to all of the other directors 344a-344c and/or the tamper-proof module 342 at the same time.

Figure 17B:
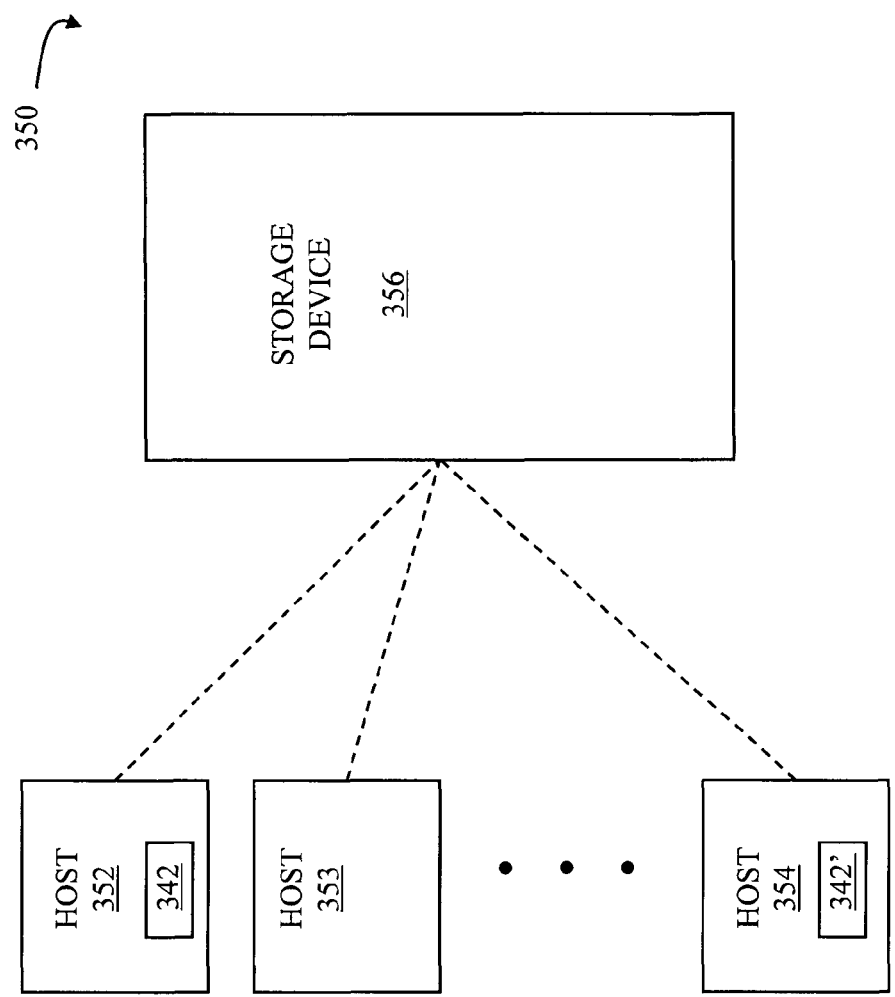
FIG. 17B is a diagram that illustrates an embodiment where a plurality of host devices may each include a tamper-proof module.

Referring to FIG. 17B, a diagram 350 illustrates an embodiment that includes a plurality of hosts 352-354 coupled to a storage device 356. Each of the hosts 352-354 may interact with the storage device 356 independent of each other. Alternatively, some or all of the hosts 352-354 may interact with the storage device 356 in concert. The diagram 350 shows the hosts 352 containing the tamper-proof module 342 while the host 354 contains its own version of a tamper-proof module 342'. In the embodiment illustrated by the diagram 350, the functionality of the tamper-proof modules 342, 342' is moved from the storage device 356 (illustrated by the diagram 340 of FIG. 17A) into each of the hosts 352-354.

Note that it is not necessary for all of the hosts 352-354 to have a tampered-proof module. For example, the diagram 350 shows the hosts of 353 as not including a tamper-proof module. In some embodiments, it is only necessary to provide a tamper-proof module to hosts performing the encryption/decryption function described herein. Note also that it is possible to have encrypting be performed on either the storage device or one of the hosts while decrypting is performed on the other one and that, generally, the functionality described herein may be provided on any appropriate device or combination of devices and may even be moved during operation.

Note that, in instances where data where data is always encrypted for a particular volume, file, or other storage unit (i.e., where data is encrypted at the time of creation and thereafter), it may be advantageous to have the tamper-proof module 342 be in the host(s) to avoid clear-text transmission of data between the host(s) and the storage device. On the other hand, in instances where data is being encrypted in connection with a data migration (either in-place or to another location), it may be advantageous to have the tamper-proof module 342 be part of the storage device. Of course, it is also possible to have tamper-proof modules be both part of the storage device and part of one or more of the host(s). In addition, it is also possible to provide the functionality described herein separate or at least partially separate from both the storage device and the host(s).

For both the embodiment described in connection with FIG. 17A and the embodiment described in connection with FIG. 17B (and any other embodiments), the tamper-proof module 342 may be implemented using hardware, software, or a combination thereof that does not allow inspection of data inside the tamper-proof module 342. For example, if the tamper-proof module 342 is implemented using hardware (e.g., a single chip), the hardware may have a self-destruct mechanism that is activated whenever someone tries to open the hardware. The tamper-proof module may be implemented using the S/390 system (z/Architecture) provided by IBM, discussed elsewhere herein.

Figure 18:
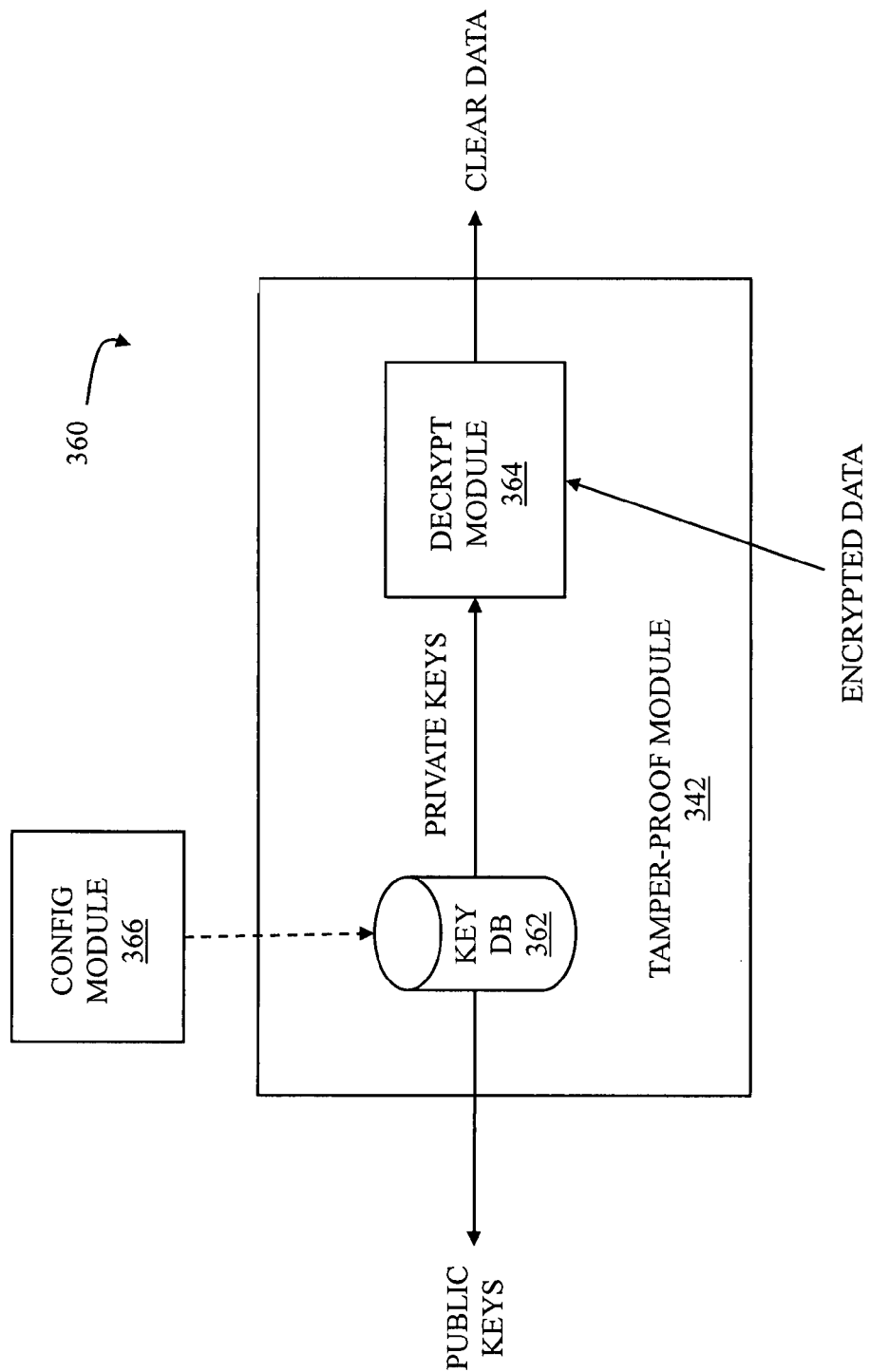
FIG. 18 is a diagram that illustrates components of the tamper proof module according to an embodiment of the system described herein.

Referring to FIG. 18, a diagram 360 illustrates components of the tamper proof module 342. Note that the tamper proof module 342 may be implemented using hardware, software, or any appropriate combination thereof. When the tamper proof module 342 is implemented using software and/or a significant amount of software, the storage device may be configured to only allow certain access to the tamper-proof module 342.

The diagram 360 shows the tamper proof module 342 as including a key database 362 and a decryption module 364. The key database 362 may include all the public keys/private key pairs used for encrypting and decrypting data. The tamper proof module 342 provides, as an output thereto, the public keys (but only the public keys) from the key database 362. As discussed elsewhere herein, the public keys are not secret and are known or knowable by any entity that wishes to encrypt data.

The private keys of the public key/private key pairs stored in the key database 362 are provided to a decryption module 364. The decryption module 364 receives encrypted data from outside the tamper proof module 342 and provides, as an output of the tamper proof module 342, the decrypted data (clear data). In an embodiment herein, no external access is provided to the key data base 362, the decrypt module 364, or any data communication path therebetween. This may be implemented using tamper proof hardware (e.g., a chip) that self-destructs if opened. Alternatively, there may be software/system implementations that prohibit access to the key database 362, the decryption module 364, and/or any data path therebetween.

In some embodiments, a configuration module 366 may be used for providing data to the key database 362. The configuration module 366 may be appropriately secure and accessible only by authorized users. In embodiments that use the configuration module 366, only the configuration module 366 may provide public key/private key pairs to the key database 362. Having such a mechanism prevents a malicious user from providing their own public key/private key pair to the key database 362 in order to gain unauthorized access to data.

Note that with or without the configuration module 366, so long as entities are only allowed to write data to the key database 362 and not read data, it becomes difficult for a legitimately generated public key/private key pair to be compromised.

The system described herein may be implemented in connection with logical data migration where, subsequent to the logical data migration, any reads of the encrypted data (by an authorized user) use the tamper proof module 342 to decrypt the data. Note also that other mechanisms may be used to manage encrypted data. For example, it is possible to have a system where the data is always encrypted whenever written to a storage device and always decrypted whenever read from the storage device so that all of the data stored on the storage system is always encrypted. Such a mechanism may be activated by an optional flag so that a user may select whether to encrypt data or not. Note also that the system described herein may be implemented at any level of code, including microcode of the storage device that reads and writes data. The system may be implemented by intercepting data reads and data writes so that data that is written is encrypted and data that is read (by an authorized user) is decrypted.

The system described herein may be implemented in addition to any other data modification algorithms, including, for example, data compression. The encryption and decryption modules may simultaneously compress the data and/or the data may be compressed by the before or after encryption/decryption. Furthermore, for some implementations, the encryption/decryption may be provided by a user module where the user provides customized modules for encrypting and decrypting data and the system provides hooks for intercepting the data stream on reads and writes (and data migrations) so that the encryption/decryption algorithm is known only to the user that provides his own customized algorithms. In an embodiment herein, the encrypted data is the same size as the decrypted data.

The system described herein may be implemented using "in-place" data migration where data is read from a particular location, encrypted, and then placed back on to the same location. In such a system, a flag (or other appropriate mechanism) may be used to indicate whether each block is encrypted or not. Of course, it is useful if the encrypted data is the same size as the unencrypted data to avoid having to move the data to another location. Note also that a file (or volume) may be accessible while such "in-place" migration is occurring where each block would be decrypted or not depending upon the value of an indicator (e.g., a flag) that indicates whether or not a particular block has been encrypted yet. Once the "in-place" migration is complete, all of the data for the file (or volume) is encrypted so that there may no longer be any need to check the indicator.

For added security, it is possible to require that the public key/private key pairs need to be digitally signed by an authority recognized by the storage device. Thus, a malicious (unauthorized) user that attempts to write its own public key/private key pair to the key database 362 will have difficulty because there may be a mechanism that rejects all public key/private key pairs unless the public key has been digitally singed by a recognized authority (e.g., a PKI CA). In some embodiments, for additional security, the authority may be required to present its own digital certificate and proof that the certificate has not been compromised (i.e., is still valid). Such proof may take the form of a X-509 PKI CRL or any other appropriate mechanism for proving that a digital certificate has not been revoked. In some embodiments, the digital certificate presented by the authority may include the public key that is the portion of the public key/private key pair.

Referring to FIG. 19, a host memory 500 is shown as including a first application 502, a second application 504, and the third application 506. Of course, any number of applications may exist in the host memory 500. The host memory 500 is also shown as including a UCB host memory page 508, which is used to facilitate I/O operations of the applications 502, 504, 506. The UCB host memory page 508 may be stored in a portion of the memory 500 that is commonly accessible by the applications 502, 504, 506. There may be more than one UCB host memory page and UCB host memory pages may exist in any portion of the host memory 500 accessible by application(s) that access the UCB host memory page 508.

Of course, in the MVS operating system (and other operating systems), the applications 502, 504, 506 and UCB host memory page 508 may not be contiguous as shown in the host memory 500 and, in fact, may not be completely resident in the host memory 500 at different times. In addition, the memory mapping of the MVS operating system allows multiple applications to use the same internal (private) address space storage that is mapped to different physical address space storage.

Referring to FIG. 20, the UCB host memory page 508 is shown in more detail as including a plurality of UCB's 512a, 512b, 512c. The number of UCB's on the UCB host memory page 508 depends upon the size of the UCB host memory page 508 and the size of each of the UCB's 512a-512c. Each of the UCB's 512a-512c is metadata associated with a particular logical device and contains connection information that relates the logical storage space to corresponding physical storage space. UCB's are discussed in more detail elsewhere herein and are known data structure used with the MVS operating system.

Refer in FIG. 21, a portion of the host memory 500 as shown with the application 502 and the UCB host memory page 508. FIG. 21 also shows an internal page 514 that may be a part of the private address space storage of the application 502. The internal page 514 may be mapped to the UCB host memory page 508. Such a page mapping is part of the MVS operating system and may be provided using standard MVS system calls. Mapping the internal page 514 to the UCB host memory page 508 causes the application 502 to access the UCB host memory page 508 each time the application uses an address corresponding to the internal page 514. In connection with a data migration from a source device to a target device, the UCB host memory page 508 contains the UCB corresponding to the target device. Of course, the UCB host memory page 508 may contain other information, such as other UCB's (see FIG. 21), since a minimum host memory page size may be much larger than a UCB. However, the other information may not be of interest to the application 502 in connection with the system described herein. Note also that the minimum host memory page size could be larger or smaller than 4 k in other implementations and/or with different or modified operating systems.

Figure 22:
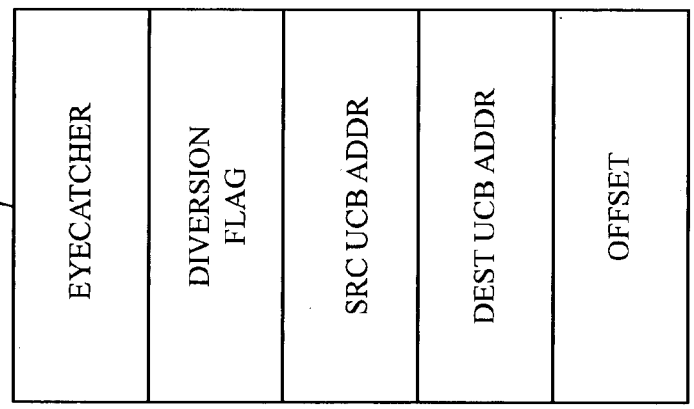
FIG. 22 is a diagram illustrating a DWUCB data structure according to an embodiment of the system described herein.

An additional small amount of internal storage space 516 may be allocated to hold additional metadata that is local to the application and used in connection with the system described herein. The additional data 516 is referred to as a DWUCB and, in an embodiment herein, may be placed immediately following the address space storage of the internal page 514. Such placement may facilitate ease of location of the DWUCB. As discussed elsewhere herein, the DWUCB may be used to facilitate migrating data from a source device to a target device in a way that allows reuse of the source device without having to terminate the application 502. However, the DWUCB structure and the mechanism disclosed herein may be used for other purposes. Referring to FIG. 22, the DWUCB 516 is shown in more detail as including a plurality of fields. A first field is an eye catcher (unique identifier) that may be used to identify the storage as being part of a DWUCB. Following this is a diversion flag, which is a Boolean flag indicating whether or not it is necessary to perform diversion on behalf of the target device. Use of the diversion flag is discussed in more detail elsewhere herein. The DWUCB 516 may also include fields corresponding to the source UCB address, the target UCB address, and the offset within the internal page 514 of the target UCB.

Figure 23:
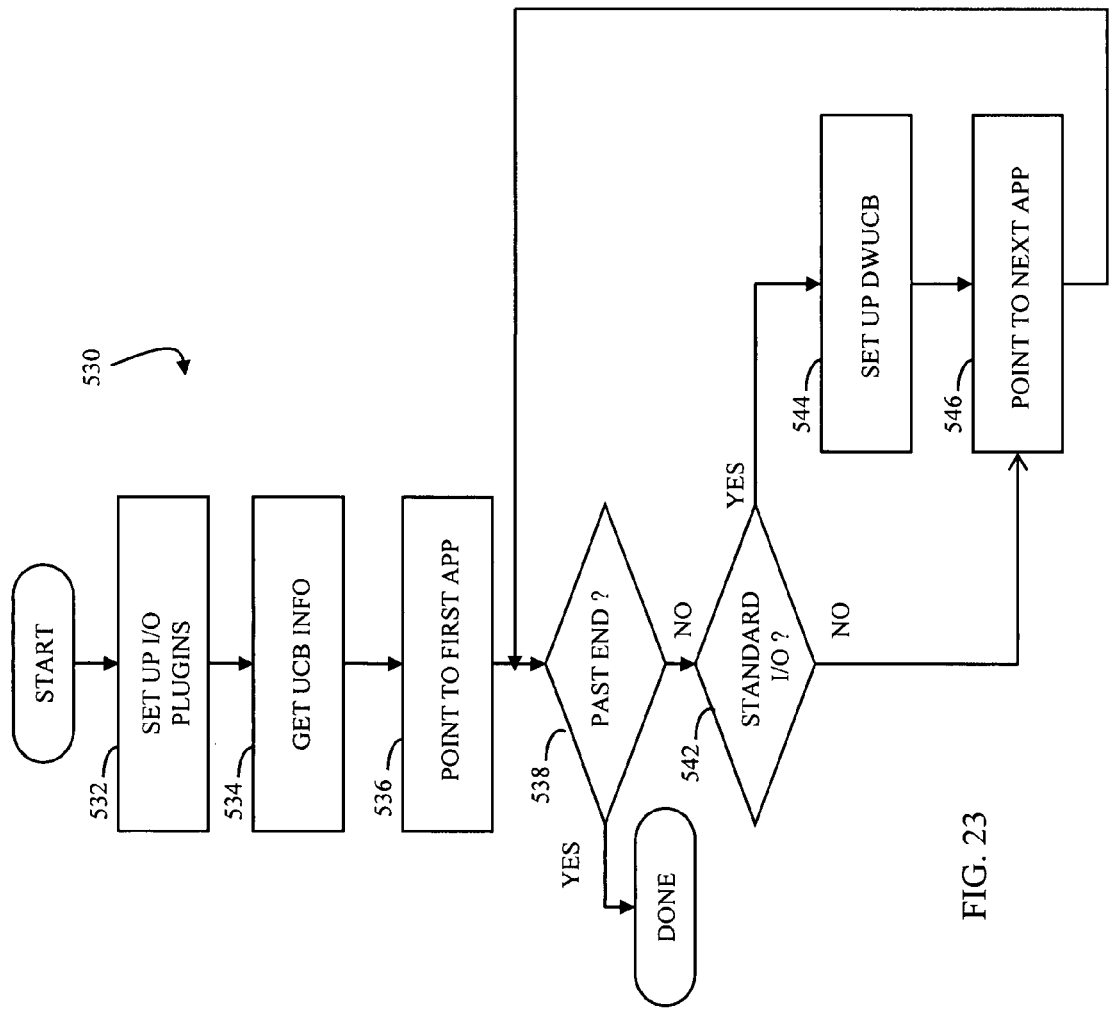
FIG. 23 is a flow chart illustrating setting up DWUCB structures for data sets on logical devices being migrated according to an embodiment of the system described herein.

Referring to FIG. 23, a flow chart 530 illustrates steps performed following a data migration to allow the source device to be reused (or possibly not used at all). Processing begins at a first step 532 where I/O plugins are initialized. In the MVS operating system, it is possible to provide plugins for system I/O calls so that the plugins are called to perform additional processing connection with I/O operations. As discussed elsewhere herein, certain I/O operations may need to be handled in a special way. For example, following data migration, read and write accesses may check the diversion flag of the DWUCB and, if set, perform appropriate remapping from extents of the source device to extents of the target device. This is discussed, for example, in connection with FIG. 8. The test at the step 163 of the flow chart of FIG. 8 may examine the diversion flag of the DWUCB in instances where an I/O request is referencing a UCB having a corresponding DWUCB. In addition, special processing may be performed in connection with other I/O operations, such as extent inquiries. The plugins handle the additional, non-standard, processing performed in connection with I/O operations.

Following the step 532 is a step 534 where UCB information for the UCB of the source logical device (source UCB) is obtained. The MVS operating system allows UCB inquiries that determine, among other things, the number of applications that are accessing the source UCB (have at least one open data set at the source UCB). Following the step 534 is a step 536 where a pointer (or similar) that is used to iterate through all of the applications that are accessing the source UCB is made to point to the first of the applications (e.g., in a list of applications that access the source UCB).

Following the step 536 is a test step 538 where it is determined if the pointer that iterates through the applications points past the end (i.e., if all applications that access the source UCB have been handled). If so, then processing is complete. Otherwise, control transfers from the test step 538 to a test step 542 where it is determined if the application being handled (pointed to by the pointer) uses standard I/O operations. The MVS operating system includes tests that determine if an application uses only standard system-provided I/O routines (the use of UCB's) or uses non-standard I/O routines that may perform I/O's without necessarily accessing the UCB's. Note that standard MVS access methods may reference UCB's from know MVS storage locations. When an application does not use standard MVS access methods to perform I/O operations, the UCB locations may be unknown and may not necessarily use the known MVS storage locations. If it is determined at the test step 542 that the application is using standard I/O operations, then control transfers from the step 542 to a step 544 where the DWUCB (and mapped UCB host memory page) is set up for the application. Note that the processing at the step 544 causes the application to release open data sets at the source logical device. Once all applications have released a data set at the source device, the space used by the data set is available for reuse. If all of the data sets at the source logical device are made available for reuse, then the source device itself becomes available for reuse. The processing performed at the step 544 is discussed in more detail elsewhere herein.

Following the step 544 is a step 546 where the pointer that iterates through the applications that access the UCB for the source device is incremented. Note that the step 546 is also reached if it is determined at the test step that the application does not use standard I/O. Note that the space used by data sets that are opened by applications that do not use standard I/O may not be reused until the application closes the data set or until the application terminates. Following the step 546, control transfers back to the test step 538 for another iteration for another application that uses the UCB for the source logical device.

Figure 24:
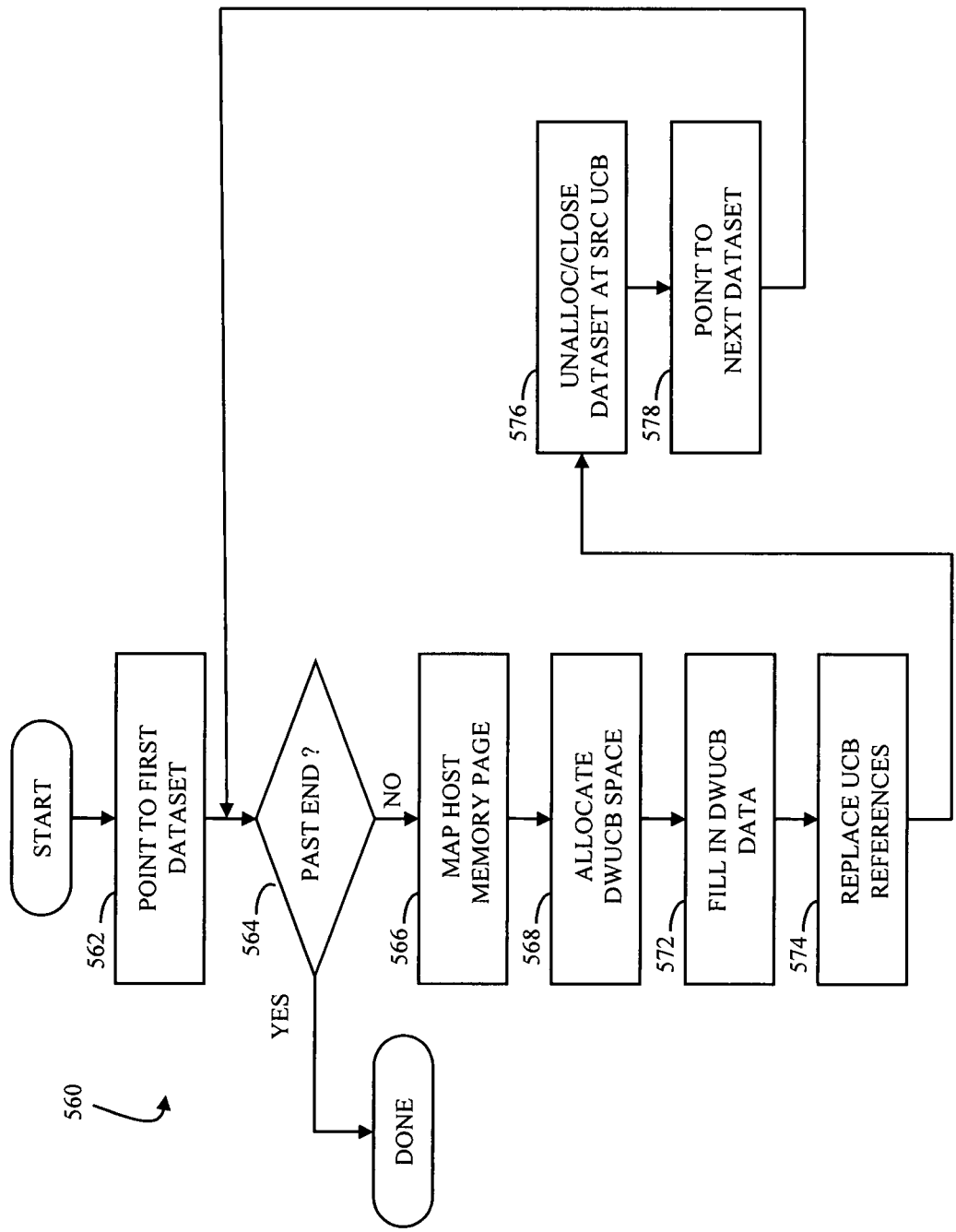
FIG. 24 is a flow chart illustrating steps performed in connection with setting up a DWUCB structure for an application having open data sets on logical devices being migrated according to an embodiment of the system described herein.

Referring to FIG. 24, a flow chart 560 illustrates in more detail processing performed at the step 544 of the flow chart 530. Note that the application may have more than one data set opened at the source UCB, so it is useful to iterate through all of the data sets. Processing begins at a first step 562 where a pointer that iterates through all of the data sets opened by the application is set to point to the first data set (e.g., in a list of open data sets obtained by standard calls provided by the MVS operating system). Following the step 562 is a test step 564 where it is determined if all of the open data sets have been handled. If so, then processing is complete. Otherwise, control transfers from the step 564 to a step 566 where the application obtains a page (i.e., a minimum 4 k page) that maps internal (private) address space storage of the application to the UCB host memory page. The processing performed at the step 566 may be performed using standard MVS system calls.

Following the step 566 is a step 568 where space for the DWUCB is allocated. In an embodiment herein, the DWUCB space is provided immediately following the private address space storage mapped to the UCB host memory page, which allows the DWUCB to be easily located when a reference to the UCB is made. Of course, any appropriate address space storage may be used. It is useful to have the space for the DWUCB located in the private address space storage of the application. Following the step 568 is a step 572 where values are provided for the fields of the DWUCB. Following the step 572 is a step 574 where the address of the source UCB is replaced throughout the application with the address of the UCB used for the target logical device. Note that doing this causes the application to releases the open data set on the source logical device. Once no other applications have the same data set open, the space occupied by the data set becomes available for reuse. Of course, the source UCB itself will be maintained (for remapping from the source device to the target device) until all of the DWUCB diversion flags of all the data sets that use the source UCB are cleared.

Following the step 574 is a step 576 where the data set at the source logical device is closed/unallocated, thus allowing the file system to reclaim the space (after all applications have closed/unallocated the same data set). The processing illustrated herein essentially substitutes the target logical device for the source logical device without disrupting the application. Remapping extents from the source device to the target device like that illustrated in FIG. 8 may continue to occur so long as the diversion flag is set. Following the step 576 is a step 578 where the pointer that iterates through the data sets of the application is made to point to the next open data set on source logical device. Following the step 578, control transfers back to the step 564 for a next iteration.

The data structures that use extents that map the address space storage of the source logical device to corresponding physical space may are known. However, I/O operations may be in any state and thus it may not be desirable to modify the extents. An I/O operation that mixes source and target extents in mid-operation may be undesirable. Thus, the diversion flag may remain set (to signal mapping from source extents to target extents) until the application either closes the data set or the application terminates. In some instances, it may be useful to be able to clear the diversion flag. Opportunities for this may occur during certain operations, when I/O operations may be expected to quiesce. For example, following an extents inquiry (in response, for example, to changing extents), it is expected that all I/O operations will eventually use the new extents.

Figure 25:
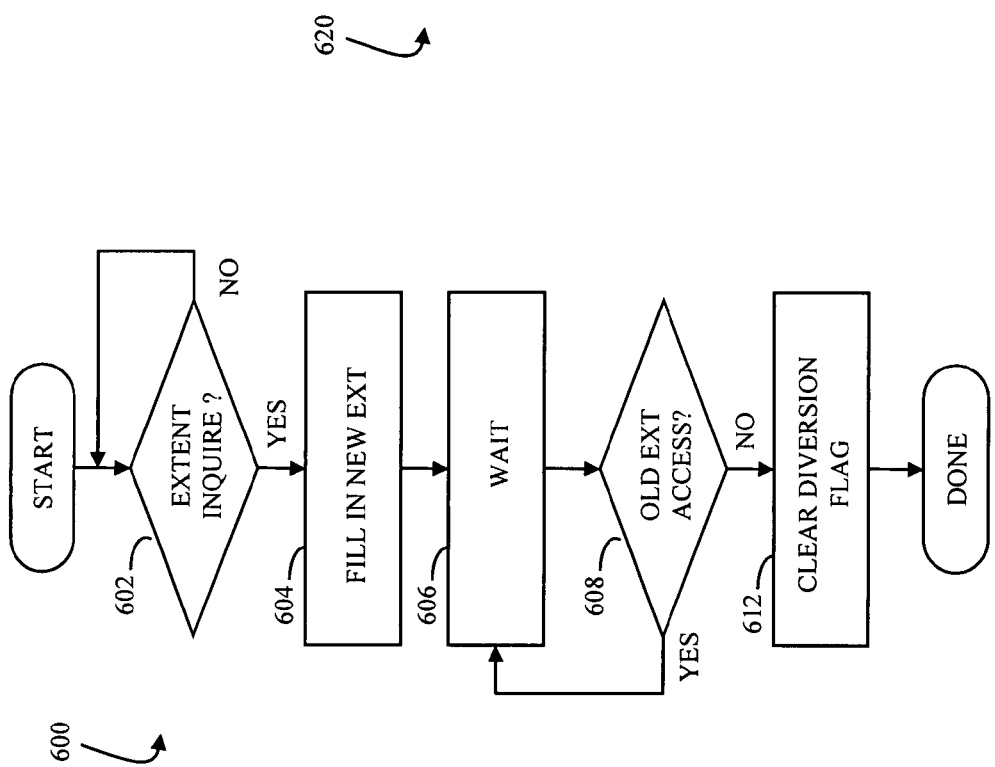
FIG. 25 is a flow chart illustrating steps performed in connection with clearing a DWUCB diversion flag according to an embodiment of the system described herein.

Referring to FIG. 25, a flow chart 600 illustrates steps performed in connection with clearing the DWUCB diversion flag. Processing begins at a first test step 602 where it is determined if an extents inquiry has occurred. If not, control loops back on the step 602 to continue to poll. The processing illustrated by the step 602 is meant to indicate that the follow on steps (the remaining steps in the flow chart 600) are meant to be performed upon the occurrence of an extents inquiry. Note also that there may be other operations, besides an extents inquiry, following which it is acceptable to replace the source extents with the target extents within data structures of an application.

Once it is determined at the test step 602 that an extents inquiry has occurred, then control passes from the step 602 to a step 604 where, for all the known data structures that contain extents, the source extents are replaced with the target extents. The known MVS data structures include, but are not limited to, the DEB, EDB, JFCB, SIOT, TIOT, and the TIOTX. Following the step 604 is a step 606 where the system waits (for any in-process I/O's to finish). In an embodiment herein, the system waits for an amount of time necessary for any in-process I/O routines to finish, but of course other wait time may also be acceptable. Following the step 606 is test step 608 where it is determined if any I/O operations have accessed the old extent data (indicating that not all I/O's that used the old extents have finished yet). If so, then control transfers back to the step 606 to continue to wait. Otherwise, control transfers from the step 608 to a step 612, where the DWUCB diversion flag is cleared. Following the step 612, processing is complete. Note that, in some embodiments, the steps 606, 608 may not be used at all since in can be assumed that the extent inquiry (or similar operation) would not occur in the first place if there were any in-process I/O routines. In other embodiments, it may be possible to replace the steps 606, 608 with a single step that actually waits for any in-process I/O operations to complete.

Note that once the DWUCB diversion flag has been cleared, the DWUCB structure is no longer needed. Also, if the DWUCB diversion flags are cleared for all data sets that had accessed a source logical device, then the source UCB (and related data structures) may be removed. Thus, the test step 182 of FIG. 9 may be modified to also test if all of the DWUCB diversion flags have been cleared.

The source device reuse system described herein may be used in conjunction with any other features, including dynamic data set migration and/or encryption. Note also that the DWUCB mechanism described herein may be used for situations other than data migration. For example, the DWUCB mechanism may be used in situations where it is desirable to redirect I/O operations or otherwise perform special processing in connection with I/O operations. It is also possible to use the DWUCB mechanism to facilitate accessing a device as a gatekeeper to a controller. In such a case, the DWUCB may be used to dynamically remap to a different UCB based on how busy the device is or even to access a completely different controller.

Figure 26:
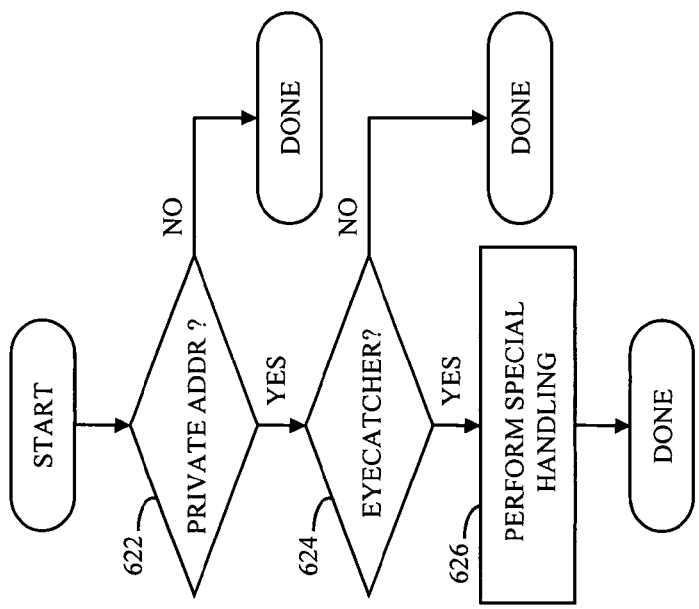
FIG. 26 is a flow chart illustrating steps performed by an I/O plugin in connection with handling processing associated with DWUCB's according to an embodiment of the system described herein.

Referring to FIG. 26, a flow chart 620 illustrates steps performed by an I/O plugin in connection with using the DWUCB mechanism for special processing in connection with I/O operations. Processing begins at a first test step 622 where it is determined if the I/O operation is being performed on a UCB having a private address (e.g., the internal page 514 that maps to the UCB host memory page 508). If it is determined at the step 622 that the UCB does not have a private address (and thus is not associated with a DWUCB), then processing is complete. Otherwise, control transfers from the step 622 to a test step 624 where it is determined if the data at the address where the DWUCB should start (if the UCB is associated with a DWUCB) equals the value used for the eyecatcher (unique value that identifies the DWUCB). If not, then processing is complete. Otherwise, control transfers from the step 624 to a step 626 where special processing is performed in connection with the DWUCB. Following the step 626, processing is complete.

The special processing performed at the step 626 can includes, for example, processing used to divert data in connection with data migration, as discussed above, or could include other types of special processing. Note also that it is not necessary to use the same fields for the DWUCB as shown in FIG. 22 (except, perhaps, that it is useful to have the eyecatcher or something equivalent). The actual fields used for the DWUCB depend upon the particular use of the DWUCB, For example, if the DWUCB were being used to redirect I/O to one of a plurality of different logical devices, then the DWUCB could have a field indicating which of the plurality of logical devices to which the I/O is to be redirected.

The above-noted steps, and other steps described herein, may be performed automatically by the system described herein. Alternatively, the steps described herein may be activated manually by a user and/or a system administrator. In an embodiment, the system described herein may include a system having at least one processor that performs any of the above-noted steps. Further, computer software, stored in a computer-readable medium, may be provided according to the system described herein including executable code for carrying out any of the steps and processes described herein.

While the invention has been disclosed in connection with various embodiments, modifications thereon will be readily apparent to those skilled in the art. Accordingly, the spirit and scope of the invention is set forth in the following claims.

What is claimed is:

1. A method of releasing a data set at a source device in connection with migrating data from the source device to a target device, the method comprising:

mapping application address space to address space containing metadata for the target device and providing additional local metadata therefor;

migrating the data from the source device to the target device;

replacing within the application the address of metadata for the source device with the address of metadata for the target device;

setting a diversion flag that is part of the additional local metadata, wherein the diversion flag indicates a remapping of extents, wherein, before replacing within the application the address of metadata for the source device with the address of metadata for the target device, input/output (I/O) operations of the application are diverted from the source device to the target device based on the diversion flag without disrupting the application, wherein the diversion flag is located in a data structure provided with private address space storage of the application that is mapped to a host memory page corresponding to the data that allows the diversion flag of the data structure to be located when the data is referenced, and wherein, after migrating the data and after replacing within the application the address of metadata for the source device with the address of metadata for the target device, the diversion flag is cleared and the data set at the source device is released without the application having to terminate; and closing and unallocating the data set at the source device, wherein the closing and unallocating of the data set are performed without the application having to terminate, and wherein memory space at the source device used for the data set is made available for reuse without the application having to terminate.

2. A method, according to claim 1, further comprising: determining if the application uses standard input/output (I/O) operations.

3. A method, according to claim 1, wherein the metadata includes unit control block (UCB) data.

4. A method, according to claim 1, wherein, in response to the diversion flag being set, extents for the source device are remapped to extents for the target device prior to an input/output (I/O) operation.

5. A method, according to claim 1, further comprising: replacing instances of extents for the source device with extents for the target device.

6. A method, according to claim 5, further comprising: after a predetermined amount time without use of the extents for the source device, clearing the diversion flag.

7. A method, according to claim 5, wherein a unit control block (UCB) for the source device is maintained until all diversion flags for data sets thereon are closed.

8. A method, according to claim 5, wherein replacing instances of extents for the source device with extents for the target device is performed in response to an extents inquiry.

9. A method, according to claim 1, wherein the additional local metadata includes an address of a unit control block (UCB) for the source device, an address of a unit control block (UCB) for the target device, and an offset within the mapped application address space of the unit control block (UCB) of the target device.

10. A method, according to claim 1, wherein the additional local metadata is provided immediately following the application address space mapped to the address space containing metadata.

11. A non-transitory computer-readable medium storing software that releases a data set at a source device in connection with migrating data from the source device to a target device, the software comprising:
   executable code that maps application address space to address space containing metadata for the target device and provides additional local metadata therefor;
   executable code that replaces within the application the address of metadata for the source device with the address of metadata for the target device;
   executable code that migrates the data from the source device to the target device;
   executable code that sets a diversion flag that is part of the additional local metadata, wherein the diversion flag indicates a remapping of extents, wherein, before replacing within the application the address of metadata for the source device with the address of metadata for the target device, input/output (I/O) operations of the application are diverted from the source device to the target device based on the diversion flag without disrupting the application, wherein the diversion flag is located in a data structure provided with private address space storage of the application that is mapped to a host memory page corresponding to the data that allows the diversion flag of the data structure to be located when the data is referenced, and wherein, after migrating the data and after replacing within the application the address of metadata for the source device with the address of metadata for the target device, the diversion flag is cleared and the data set at the source device is released without the application having to terminate; and
   executable code that closes and unallocates the data set at the source device, wherein the closing and unallocating of the data set are performed without the application having to terminate, and wherein memory space at the source device used for the data set is made available for reuse without the application having to terminate.

12. The non-transitory computer-readable medium according to claim 11, wherein the software further comprises:
   executable code that determines if an application uses standard input/output (I/O) operations.

13. The non-transitory computer-readable medium according to claim 11, wherein the metadata includes unit control block (UCB) data.

14. The non-transitory computer-readable medium according to claim 11, wherein, in response to the diversion flag being set, extents for the source device are remapped to extents for the target device prior to an input/output (I/O) operation.

15. The non-transitory computer-readable medium according to claim 11, wherein the software further comprises:
   executable code that replaces instances of extents for the source device with extents for the target device.

16. The non-transitory computer-readable medium according to claim 15, wherein the software further comprises:
   executable code that clears the diversion flag after a predetermined amount time without use of the extents for the source device.

17. The non-transitory computer-readable medium according to claim 15, wherein a unit control block (UCB) for the source device is maintained until all diversion flags for data sets thereon are closed.

18. The non-transitory computer-readable medium according to claim 15, wherein executable code replaces instances of extents for the source device with extents for the target device in response to an extents inquiry.

19. The non-transitory computer-readable medium according to claim 11, wherein the additional local metadata includes an address of a unit control block (UCB) for the source device, an address of a unit control block (UCB) for the target device, and an offset within the mapped application address space of the unit control block (UCB) of the target device.

20. The non-transitory computer-readable medium according to claim 11, wherein the additional local metadata is provided immediately following the application address space mapped to the address space containing metadata.

* * * * *